Figure 1:
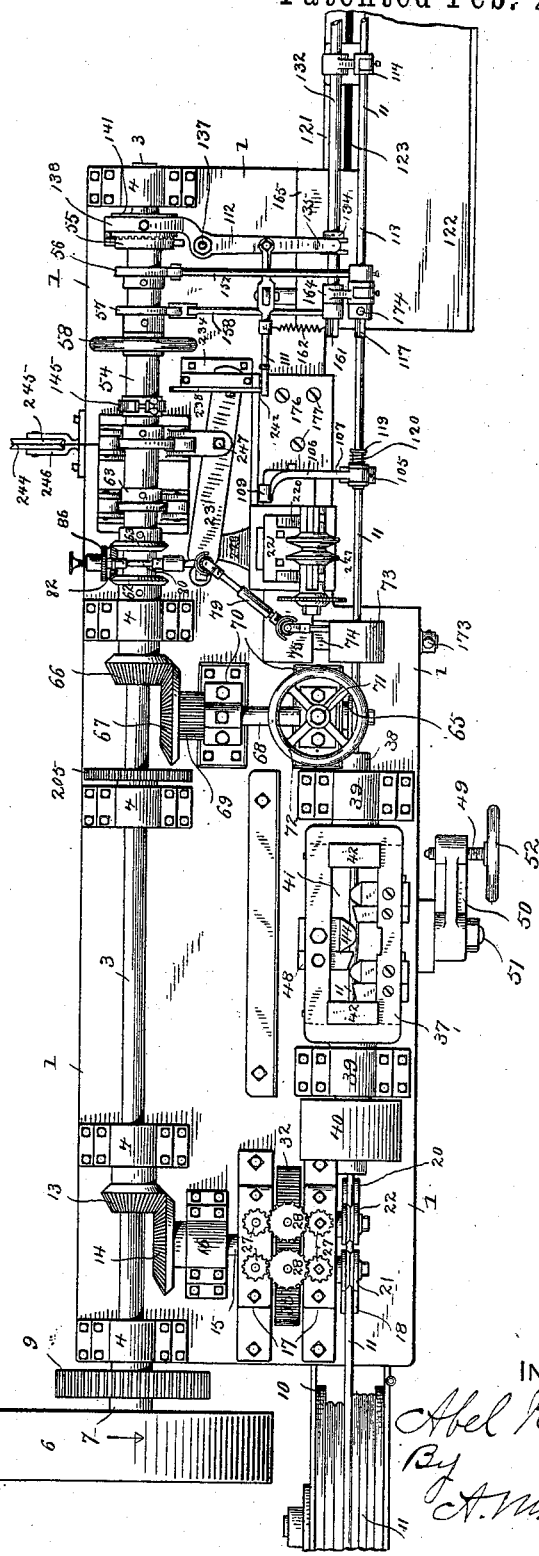

(No Model.) 12 Sheets—Sheet 2.

A. KENWORTHY.
MACHINE FOR STRAIGHTENING AND CUTTING WIRE RODS.

No. 534,693. Patented Feb. 26, 1895.

WITNESSES
H. A. Lamb
S. V. Richardson

INVENTOR
Abel Kenworthy
By H. M. Wooster
Atty.

(No Model.)

A. KENWORTHY.
MACHINE FOR STRAIGHTENING AND CUTTING WIRE RODS.

No. 534,693. Patented Feb. 26, 1895.

WITNESSES
H. A. Lamb
S. V. Richardson.

INVENTOR
Abel Kenworthy
By A. M. Wooster
Atty.

(No Model.)  12 Sheets—Sheet 5.

A. KENWORTHY.
MACHINE FOR STRAIGHTENING AND CUTTING WIRE RODS.

No. 534,693. Patented Feb. 26, 1895.

WITNESSES
H. A. Lamb
S. V. Richardson

INVENTOR
Abel Kenworthy
By A. M. Wooster
Atty.

(No Model.) 12 Sheets—Sheet 6.

A. KENWORTHY.
MACHINE FOR STRAIGHTENING AND CUTTING WIRE RODS.

No. 534,693. Patented Feb. 26, 1895.

WITNESSES
H. A. Lamb
S. V. Richardson.

INVENTOR
Abel Kenworthy
By A. M. Wooster
Atty.

(No Model.) 12 Sheets—Sheet 7.
A. KENWORTHY.
MACHINE FOR STRAIGHTENING AND CUTTING WIRE RODS.
No. 534,693. Patented Feb. 26, 1895.
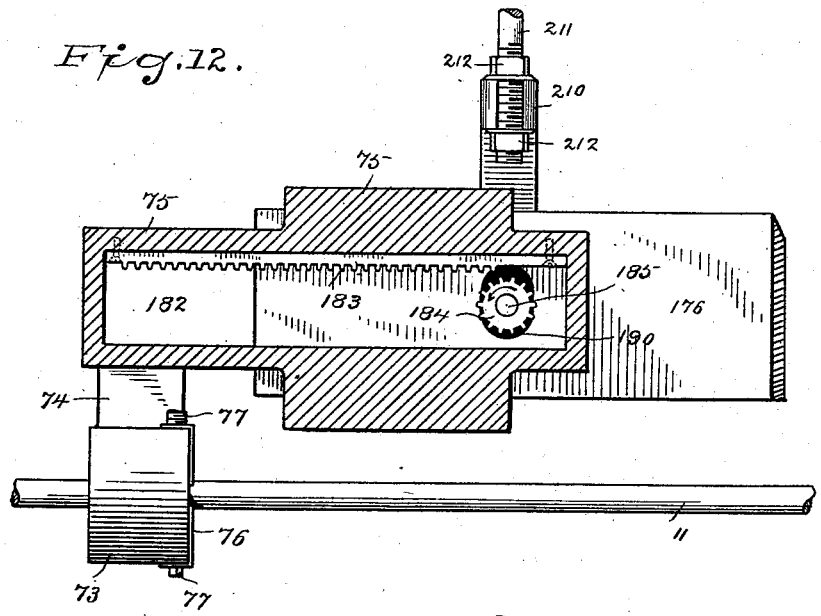
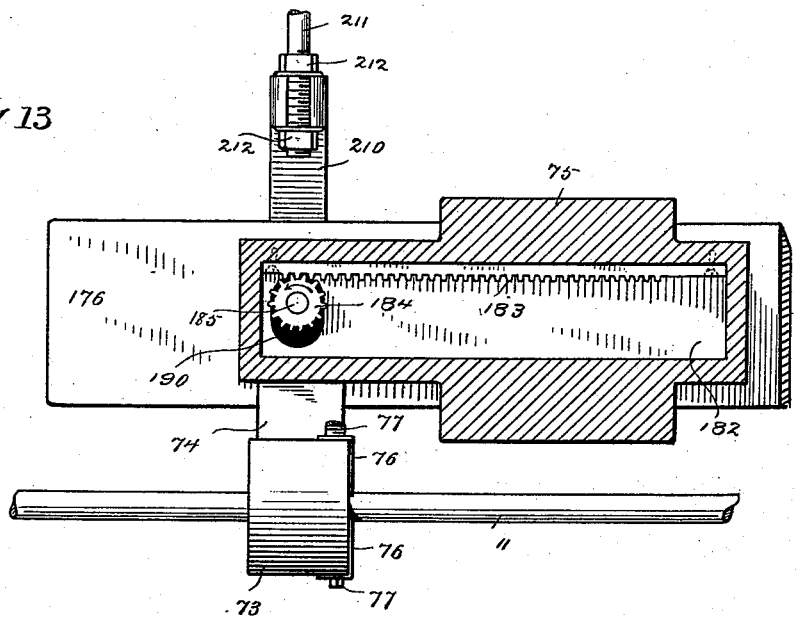
WITNESSES
H. A. Lantz
S. V. Richardson
INVENTOR
Abel Kenworthy
By A. M. Wooster
Atty.

(No Model.) 12 Sheets—Sheet 8.
A. KENWORTHY.
MACHINE FOR STRAIGHTENING AND CUTTING WIRE RODS.
No. 534,693. Patented Feb. 26, 1895.
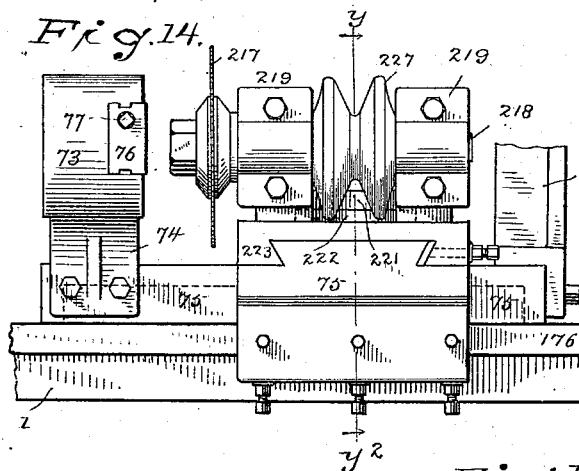
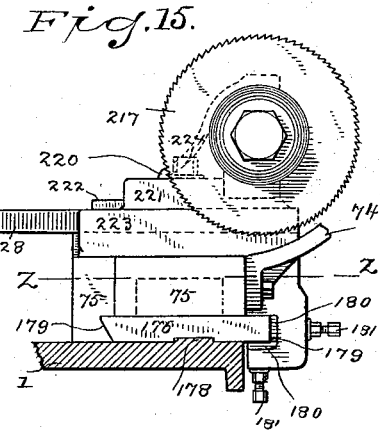
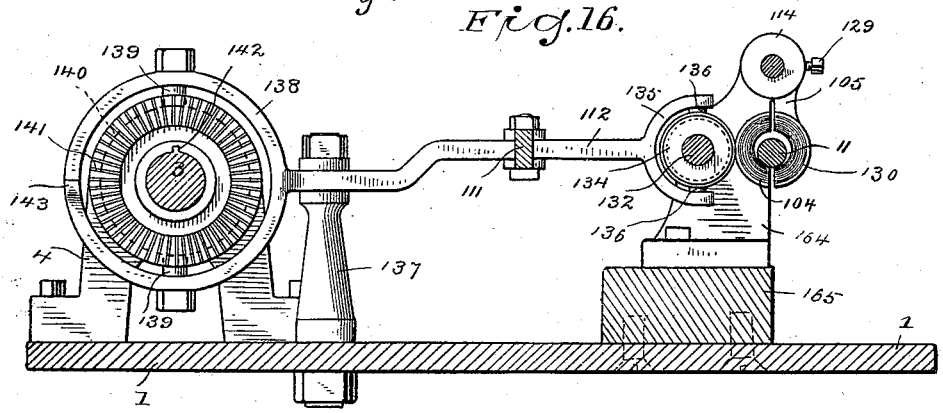
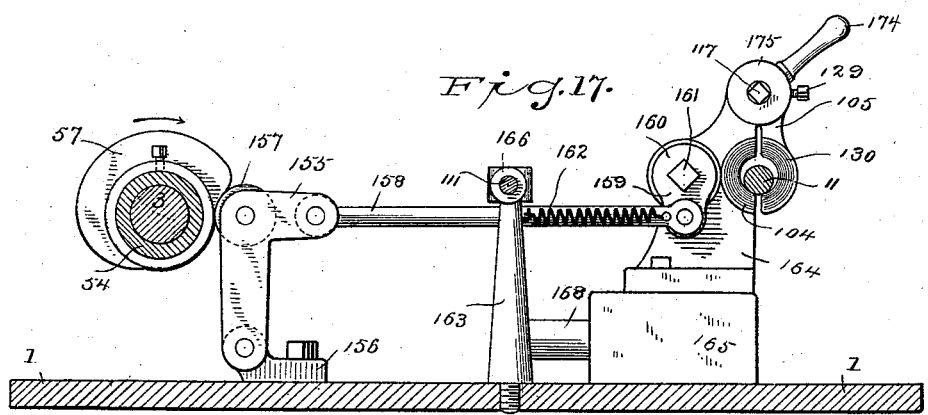
WITNESSES
H. A. Lamb
S. V. Richardson
INVENTOR
Abel Kenworthy
By H. M. Wooster
Atty.

(No Model.)
12 Sheets—Sheet 9.
A. KENWORTHY.
MACHINE FOR STRAIGHTENING AND CUTTING WIRE RODS.
No. 534,693.　　　　　　　　　　Patented Feb. 26, 1895.
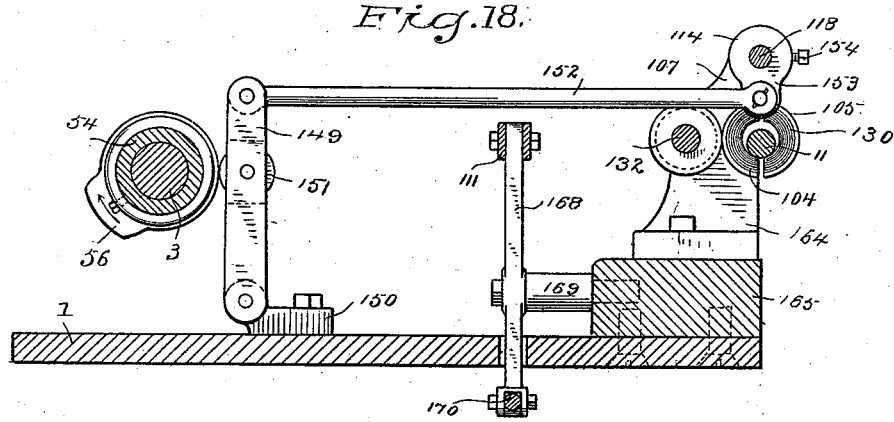
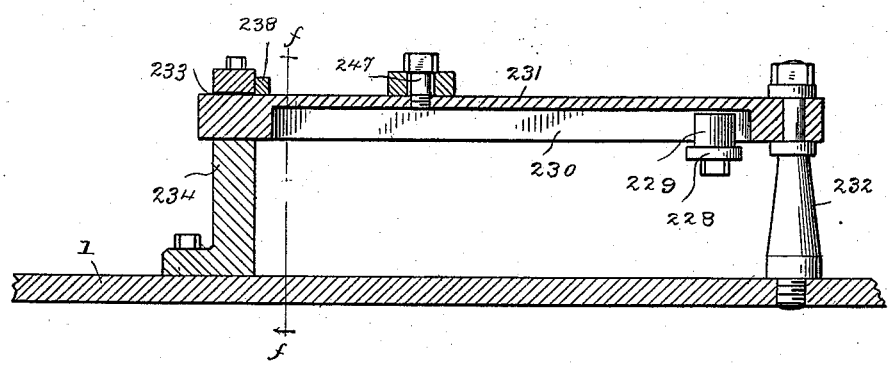
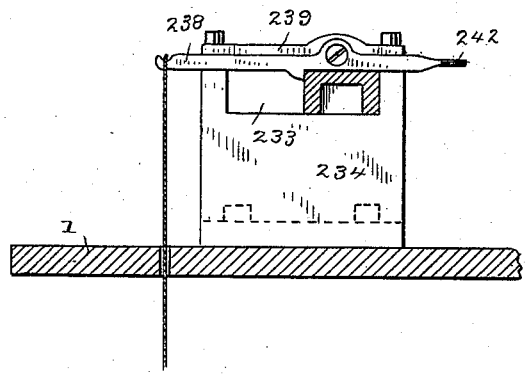
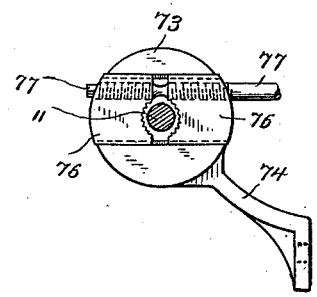
WITNESSES　　　　　　　　　　INVENTOR
H. A. Lamb　　　　　　　　　　Abel Kenworthy
S. V. Richardson　　　　　　　By A. M. Wooster
　　　　　　　　　　　　　　　　　Atty.
THE NORRIS PETERS CO., PHOTO-LITHO., WASHINGTON, D. C.

(No Model.) 12 Sheets—Sheet 10.
A. KENWORTHY.
MACHINE FOR STRAIGHTENING AND CUTTING WIRE RODS.
No. 534,693. Patented Feb. 26, 1895.
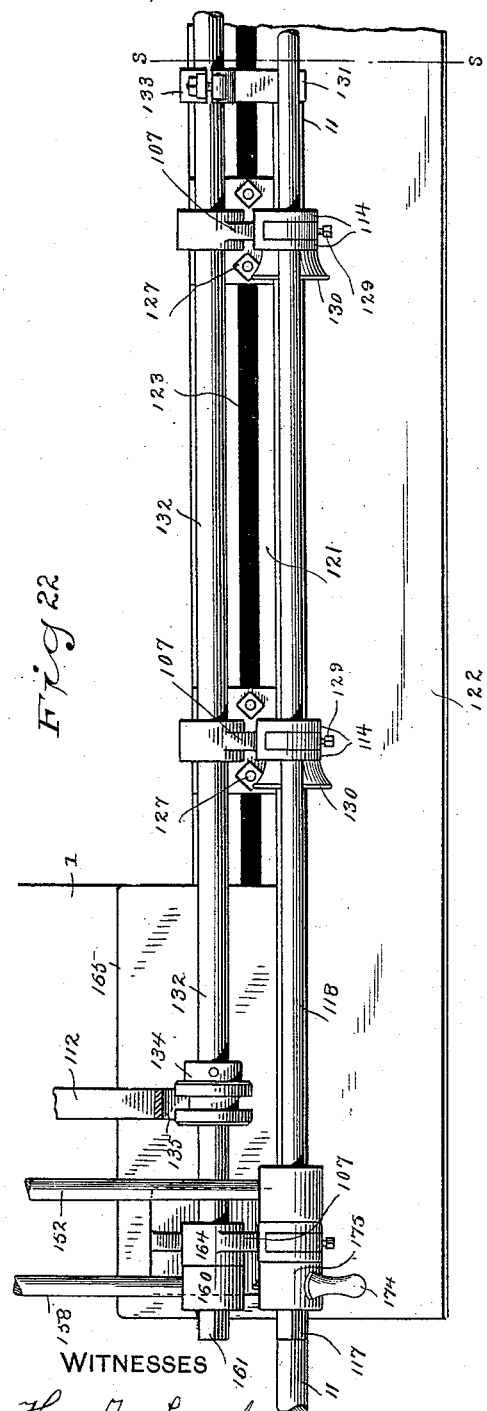
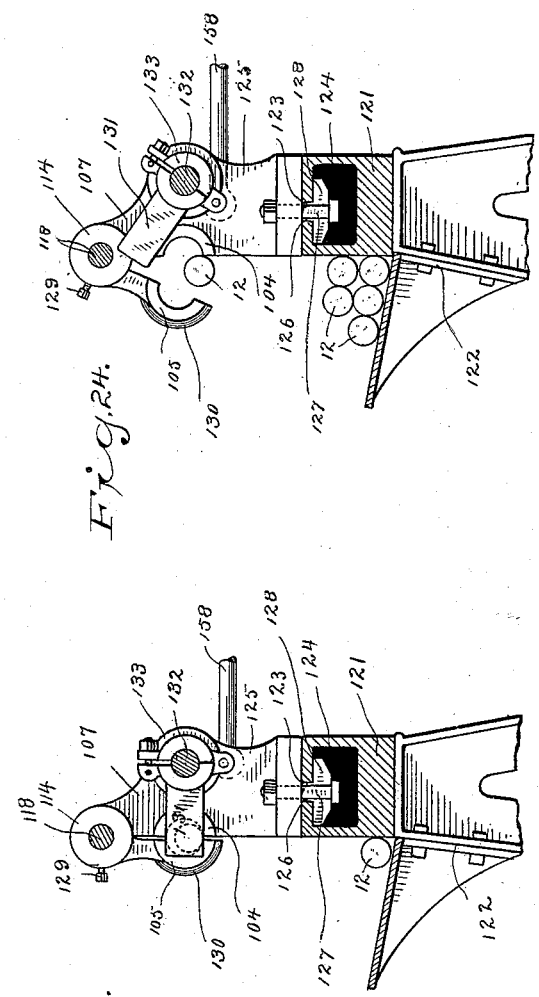

(No Model.) 12 Sheets—Sheet 11.

A. KENWORTHY.
MACHINE FOR STRAIGHTENING AND CUTTING WIRE RODS.

No. 534,693. Patented Feb. 26, 1895.

WITNESSES
H. A. Lamb
S. V. Richardson

INVENTOR
Abel Kenworthy
By A. M. Wooster
Atty.

(No Model.)  
12 Sheets—Sheet 12.

A. KENWORTHY.
MACHINE FOR STRAIGHTENING AND CUTTING WIRE RODS.

No. 534,693. Patented Feb. 26, 1895.

WITNESSES  
H. H. Lawls  
S. V. Richardson

INVENTOR  
Abel Kenworthy  
By A. M. Wooster  
Atty.

UNITED STATES PATENT OFFICE.

ABEL KENWORTHY, OF WATERBURY, CONNECTICUT, ASSIGNOR TO THE BENEDICT & BURNHAM MANUFACTURING COMPANY, OF SAME PLACE.

MACHINE FOR STRAIGHTENING AND CUTTING WIRE RODS.

SPECIFICATION forming part of Letters Patent No. 534,693, dated February 26, 1895.

Application filed December 6, 1894. Serial No. 531,025. (No model.)

*To all whom it may concern:*

Be it known that I, ABEL KENWORTHY, a citizen of the United States, residing at Waterbury, in the county of New Haven and State of Connecticut, have invented certain new and useful Improvements in Machines for Straightening and Cutting Wire Rods and Blanks; and I do hereby declare the following to be a full, clear, and exact description of the invention, such as will enable others skilled in the art to which it appertains to make and use the same.

My invention has for its object to produce an automatic machine which will take any size of wire from the reel, especially the larger sizes, straighten it and cut it into rods or blanks of any required length.

With these ends in view I have devised the novel machine of which the following description in connection with the accompanying drawings is a specification, numbers being used to designate the several parts.

Figure 2:
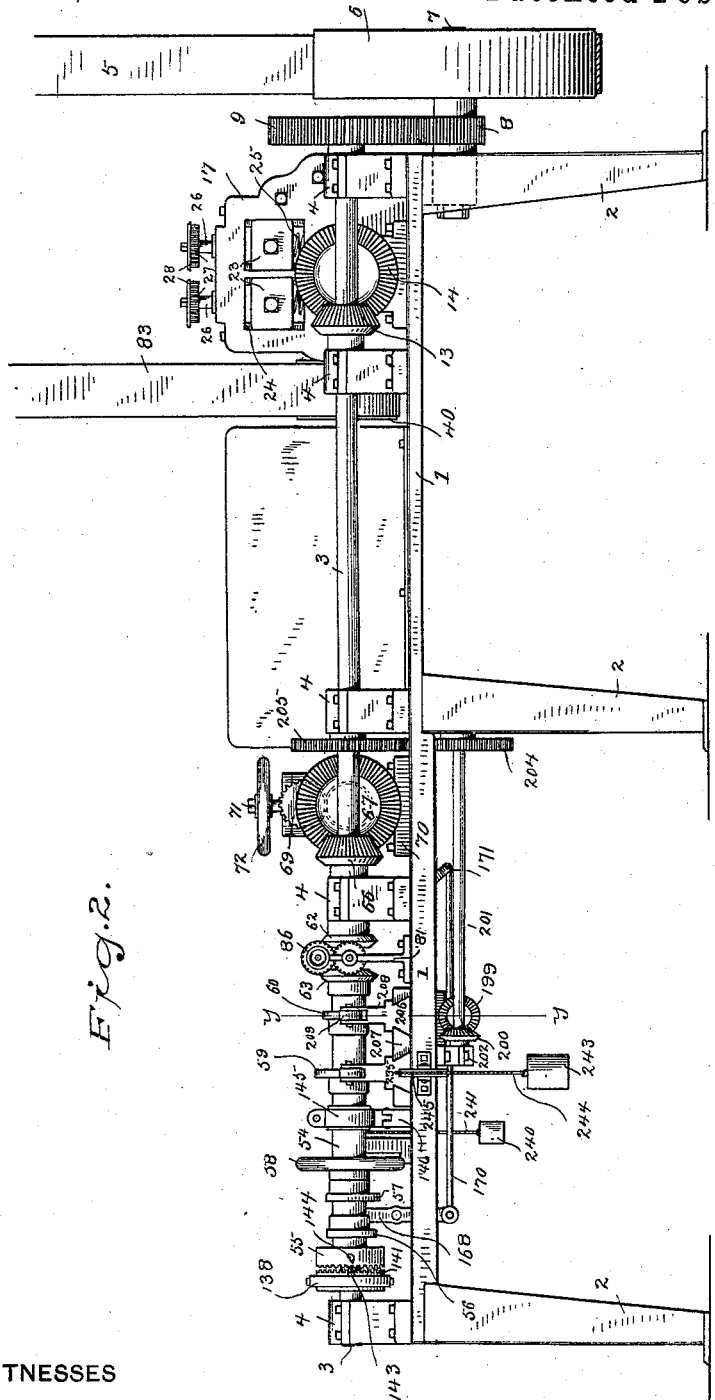
Figure 3:
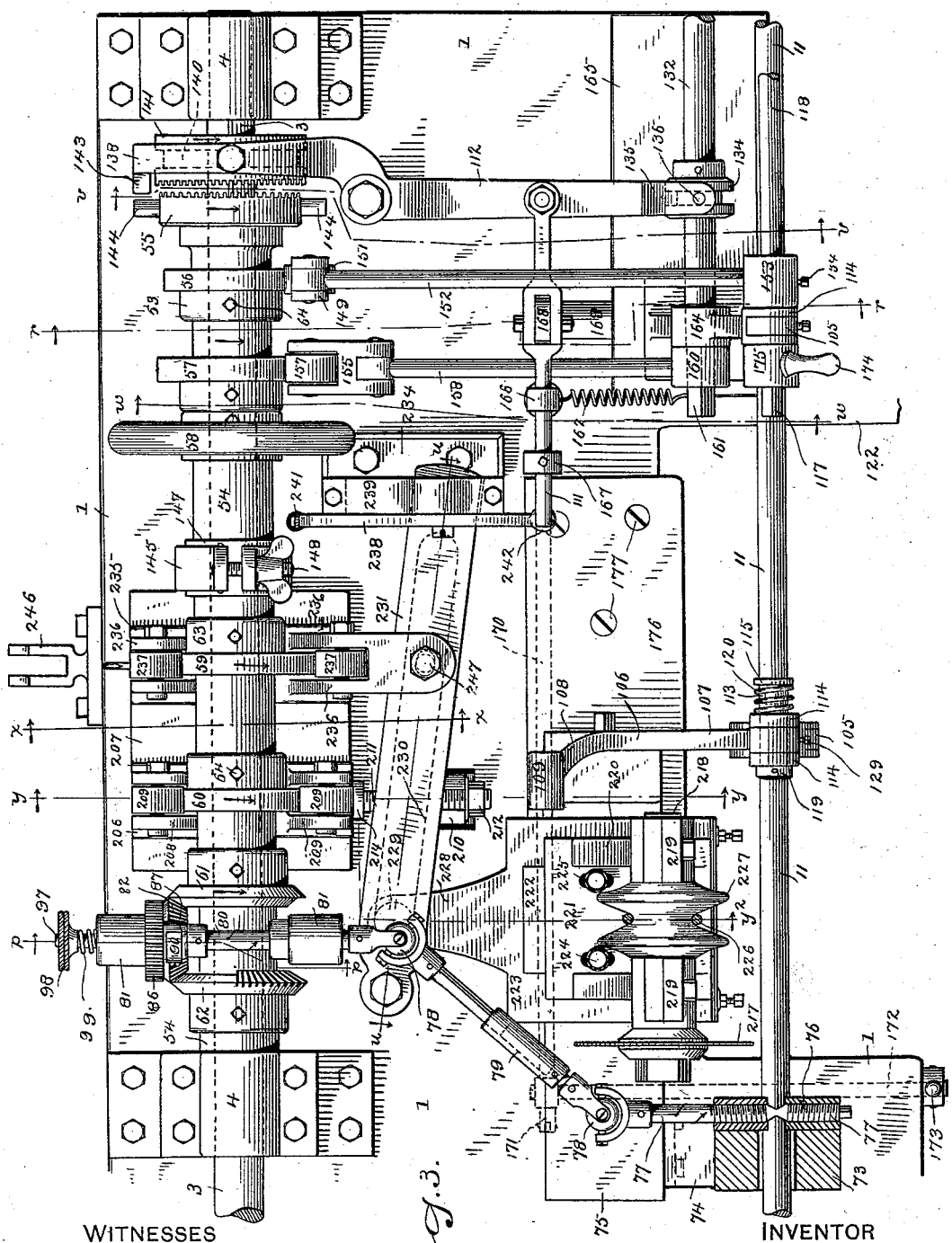
Figure 4:
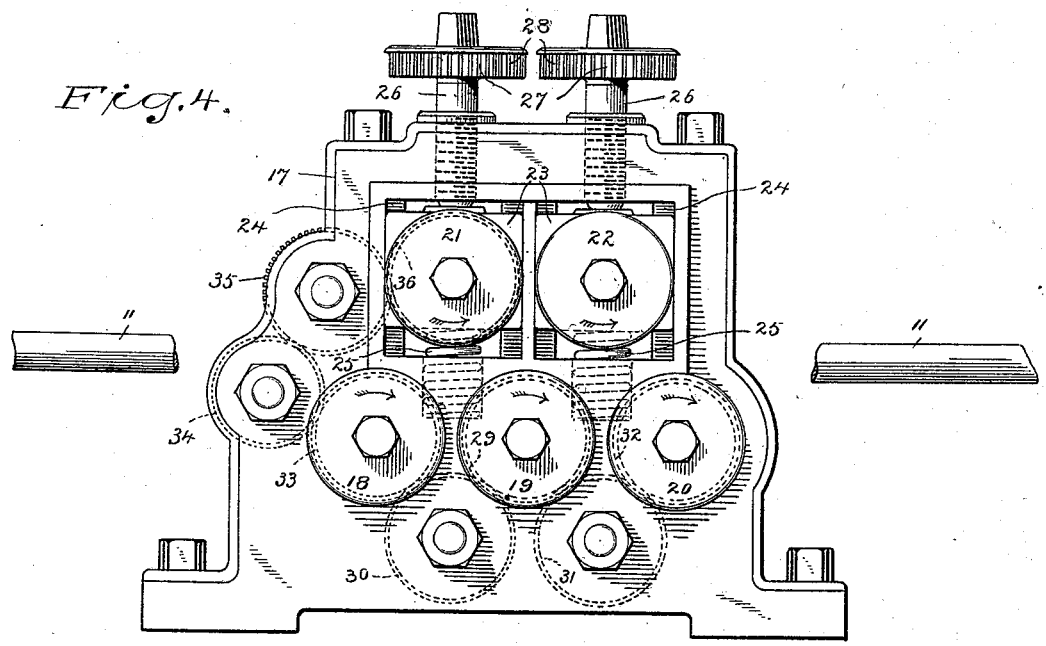
Figure 5:
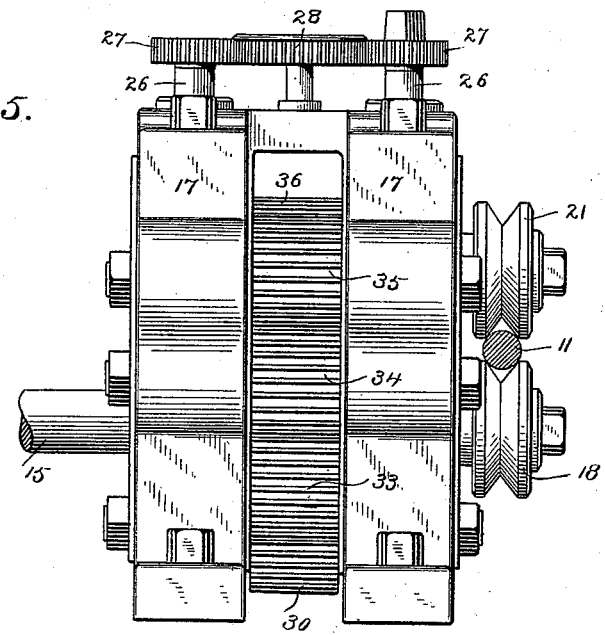
Figure 6:
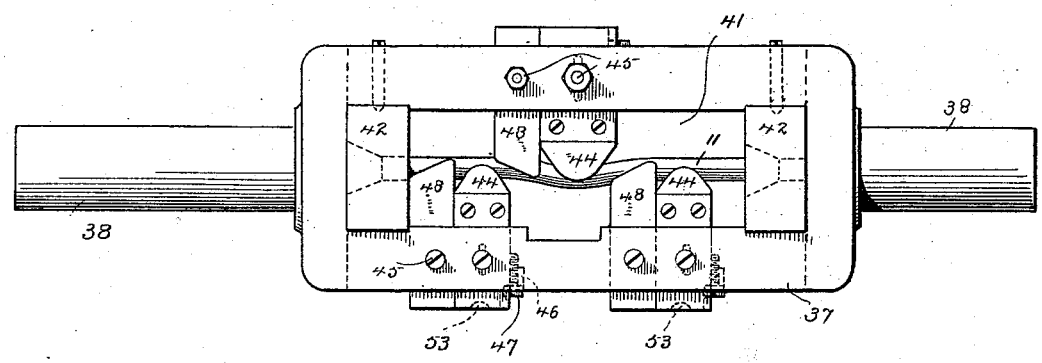
Figure 7:
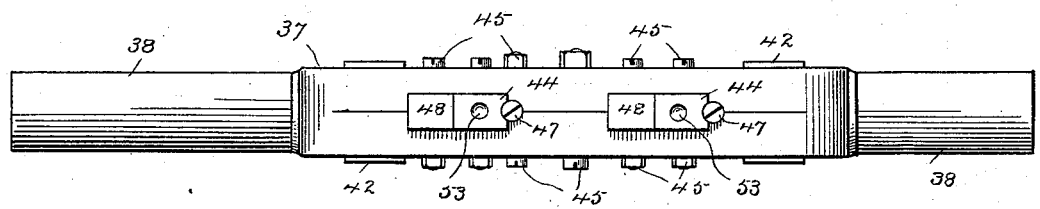
Figure 9:
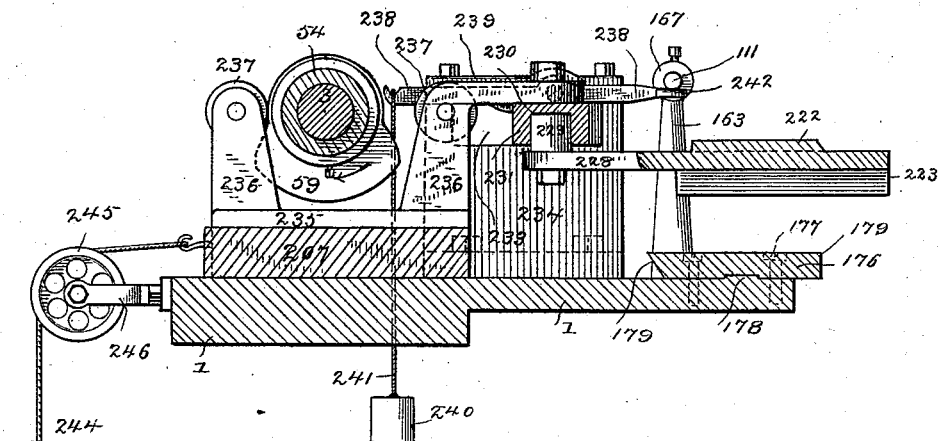
Figure 10:
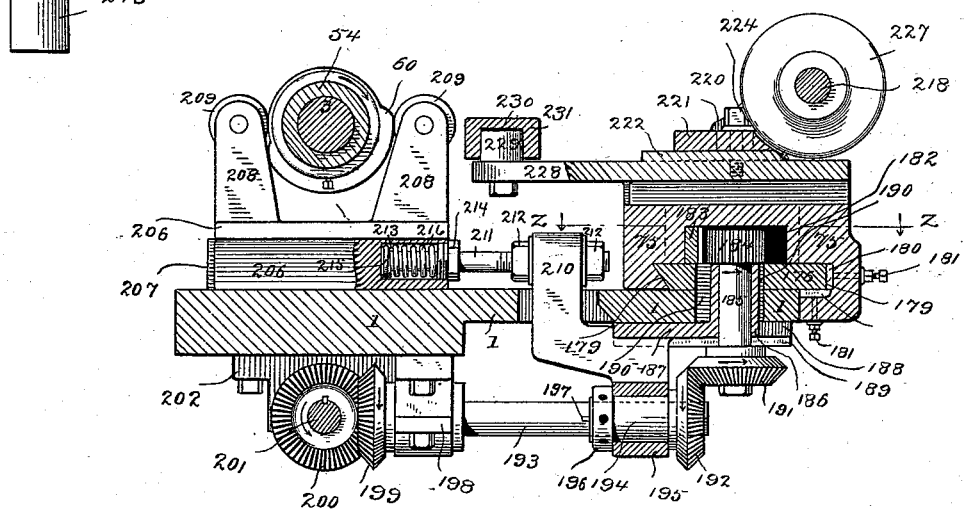
Figure 11:
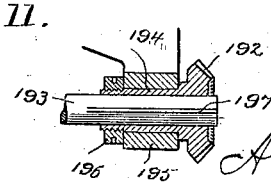
Figure 25:
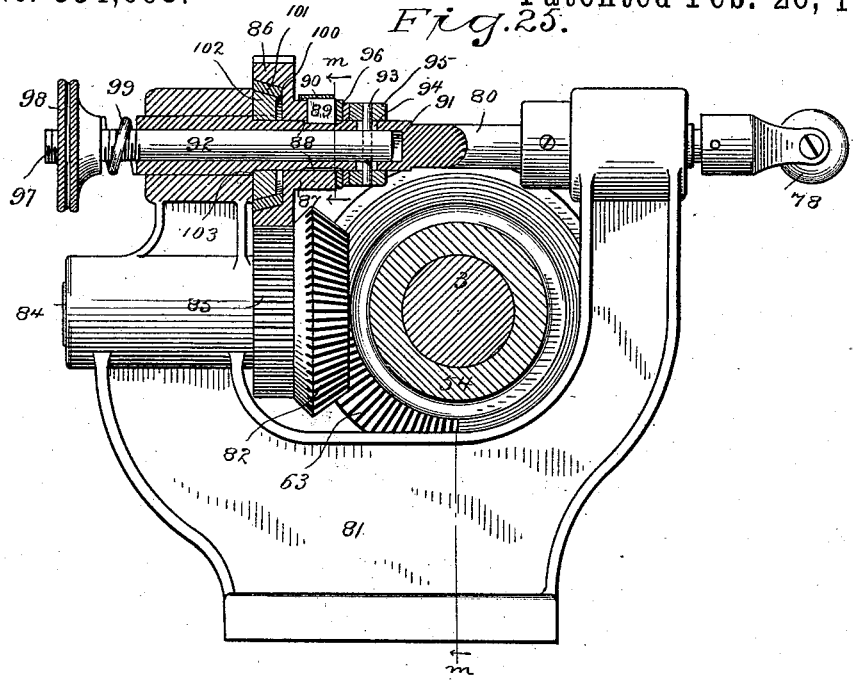
Figure 26:
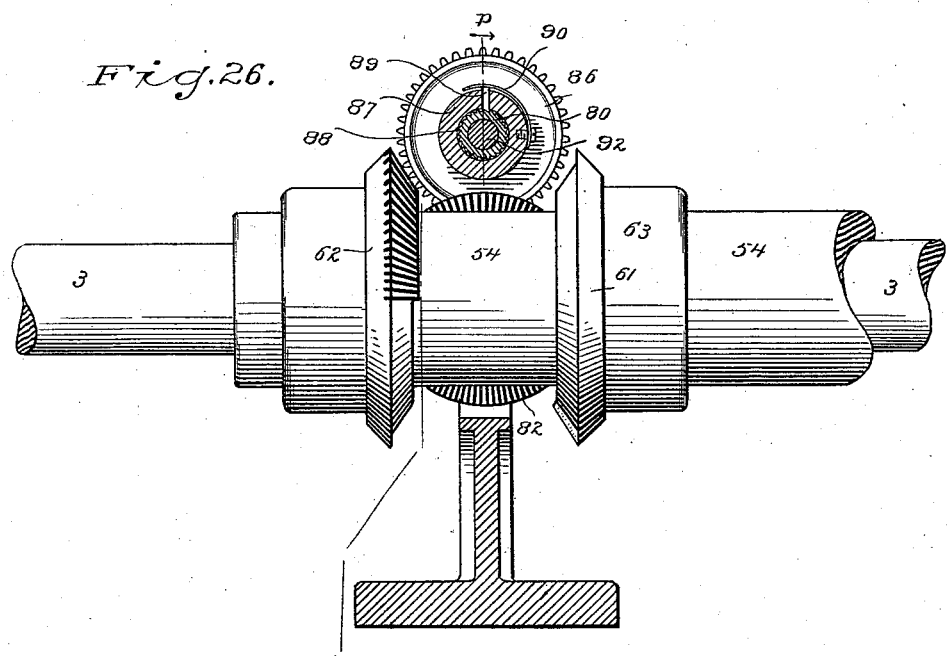
Figure 27:
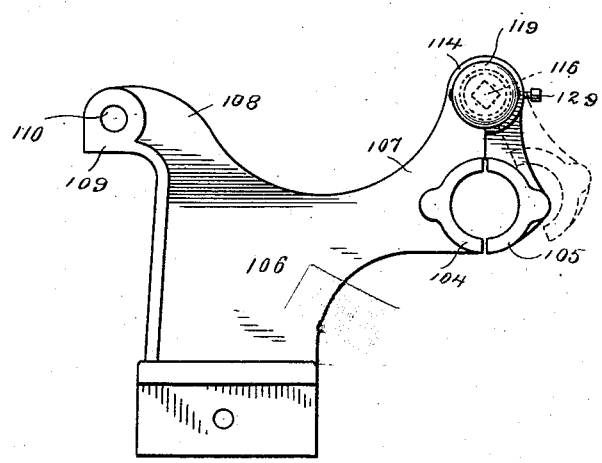
Figure 28:
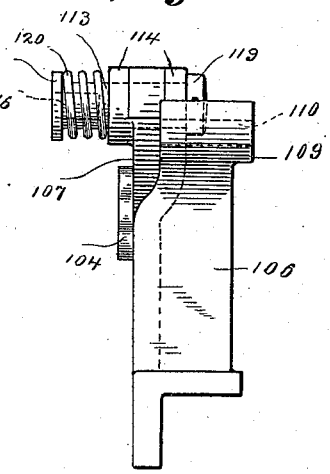
Figure 29:
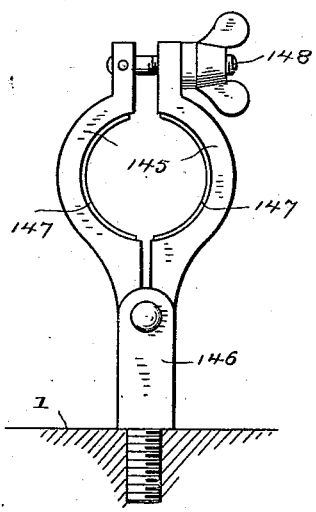
Figure 30:
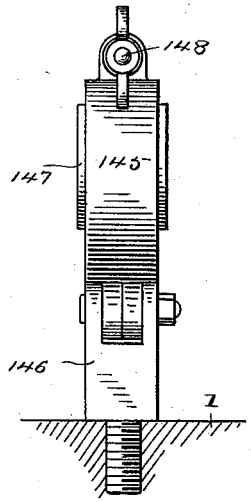

Figure 1 is a plan view of the entire machine with the exception of the blank gage and the blank releasing mechanism; Fig. 2, a side elevation as seen from the back in Fig. 1; Fig. 3, a partial plan view on an enlarged scale corresponding with Fig. 1; Fig. 4, an elevation on an enlarged scale as seen from the front in Fig. 1, illustrating the mounting and operation of the feeding and straightening rolls; Fig. 5, an end elevation of the feeding and straightening rolls and the castings in which they are mounted as seen from the left in Figs. 1 and 4; Fig. 6, a plan view; Fig. 7 an edge view, and Fig. 8 a central longitudinal section of the straightening head detached, on the same scale as Figs. 4 and 5; Fig. 9, a section on the line $x$—$x$ in Fig. 3 looking toward the right and illustrating the mechanism for operating the saw slide; Fig. 10, a section of the bed and main shaft on the line $y$—$y$ in Fig. 3 and of the saw carriage and slide on the line $y$—$y^2$ in Fig. 3, illustrating the mechanism for returning the saw carriage, the carriage in Fig. 10 having moved from the position in which it appears in Fig. 3, line $y$—$y$ also appearing in Fig. 2 and line $y$—$y^2$ appearing in Fig. 14; Fig. 11, a detail sectional view corresponding with Fig. 10; Figs. 12 and 13, sections on the line $z$—$z$ in Figs. 10 and 15 showing positions of the saw carriage at the extremes of its movement; Fig. 14, a front elevation of the saw carriage, the saw slide appearing in end elevation; Fig. 15, an elevation as seen from the left in Fig. 14; Fig. 16, a section on the line $v$—$v$ in Fig. 3 looking toward the right and illustrating the clutch operating lever; Fig. 17, a section on the line $w$—$w$ in Fig. 3, illustrating the mechanism for operating the blank gage; Fig. 18, a section on the line $r$—$r$ in Fig. 3 illustrating the blank releasing mechanism; Fig. 19, a section on the line $u$—$u$ in Fig. 3, the lever for operating the saw slide being in longitudinal section; Fig. 20, a section on the line $f$—$f$ in Fig. 19; Fig. 21, a face view of the rod gripping device; Fig. 22, an enlarged plan view illustrating in connection with Fig. 17 the mechanism for operating the blank gage and in connection with Fig. 18 the mechanism for operating the rod releasing mechanism; Figs. 23 and 24, sections on the line $s$—$s$ in Fig. 22 looking toward the left illustrating the operation of the blank gage and the manner in which a blank is released; Fig. 25, a section on the line $p$—$p$ in Figs. 3 and 26 looking toward the right, illustrating the mechanism for operating the wire gripping device; Fig. 26, a section on the line $m$—$m$ in Fig. 25 looking toward the left; Figs. 27 and 28, end and side elevations of the rod guide upon the saw carriage which is seen in plan in Figs. 1 and 3, and Figs. 29 and 30 are side and end elevations of the friction device for checking the rotation of the cam sleeve when the clutch is disconnected.

1 denotes the bed of the machine.

2 are legs by which it is supported; and 3 is the main shaft which extends longitudinally of the machine and is journaled in suitable boxes 4 on the bed.

Power is applied to drive the main shaft by a belt 5, see Fig. 2, passing over a belt pulley 6 on a short shaft 7 which is journaled in one of the legs. This shaft carries a pinion 8 which meshes with the gear 9 on the main shaft.

10 denotes a reel from which the wire passes to the machine, the wire being denoted by 11 and the cut blanks by 12.

Turning now to Figs. 4 and 5 in connection with Figs. 1 and 2 I will describe the feeding and straightening rolls and their mode of operation. These rolls are driven from the main shaft by means of a bevel pinion 13 which meshes with a bevel gear 14 on a transverse shaft 15 which is journaled in a box 16 and in castings 17 which are bolted to the bed.

18, 19 and 20 denote the lower feeding and straightening rolls, roll 19 being carried by shaft 15 and rolls 18 and 20 being carried by short shafts journaled in castings 17.

21 and 22 denote the upper feeding and straightening rolls which are carried by short shafts in blocks 23 which slide on ways 24 on castings 17, said blocks resting upon springs 25 which set in sockets in the castings as clearly shown in Fig. 4. The action of these springs is to raise the upper feeding and straightening rolls out of operative position. They are retained in operative position however, by screws 26 which pass through the top of the castings and bear upon the blocks as is clearly shown. Each of these screws carries a pinion 27 and between the screws bearing on the blocks which carry each shaft is an idler 28 which communicates motion from one pinion to the other. The end of one screw in each pair is made angular to receive a wrench or key. It will be seen that motion imparted to one screw by the wrench will be transmitted to the screw acting in connection therewith by the idler so that the two blocks in which each of the short shafts is journaled will be adjusted simultaneously. The short shafts themselves are not shown in the drawings, the construction being perfectly obvious however. An additional view to illustrate these shafts is thought to be wholly unnecessary.

Motion is imparted to the feeding and straightening rolls in the manner which I will now describe.

29, see dotted lines in Fig. 4, is a pinion on shaft 15 which meshes with idle pinions 30 and 31. Pinion 31 meshes with a pinion 32 on the short shaft which carries the feeding and straightening roll 20 and pinion 30 meshes with a pinion 33 on the short shaft which carries feeding and straightening roll 18 and also with an idle pinion 34 which in turn meshes with an idle pinion 35 which in turn meshes with a pinion 36 on the short shaft which carries feeding and straightening roll 21. Power is not applied to roll 22. Consequently it does not serve as a feeding roll but only in connection with rolls 19 and 20 as a straightening roll. Pinions 29, 31 and 32 appear only in dotted lines. Pinions 30, 33, 34, 35 and 36 appear in edge view in Fig. 5.

Figure 8:
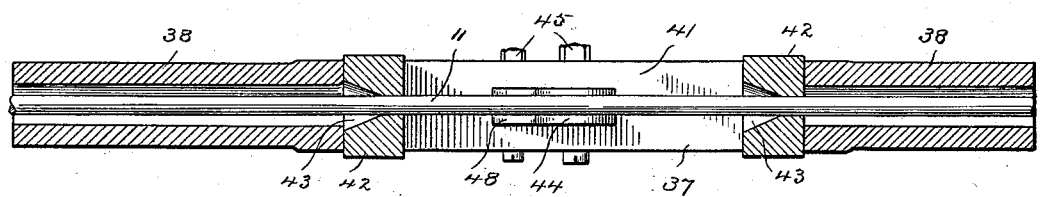

37, see Figs. 6, 7 and 8, is the straightening head which is carried by a hollow mandrel 38 journaled in boxes 39 bolted to the bed. Rotary motion is imparted to the mandrel and straightening head by means of a belt 83 passing over a belt pulley 40 on the mandrel and over another belt pulley, not shown, on a suitable counter shaft. The straightening head is provided with the usual opening 41 having at each end a block 42 with an opening 43 through it. The receiving ends of these openings are made funnel shaped so as to receive the wire freely, the remainder of each opening however, being of a size to correspond with the wire that is being operated upon, that is, of a size to permit the wire to pass freely but at the same time to hold it firmly against lateral movement.

The final straightening of the wire is accomplished by means of dies 44, three ordinarily being used, alternating with each other, on opposite sides of the head. These dies pass through the sides of the head, are adjustable toward or from the center and are locked in position after adjustment by bolts 45 which pass through the head and through slots in the dies. In order to prevent the possibility of the dies working backward in use I provide locking screws which engage the head and are themselves provided with heads 47 which engage shoulders or ledges on the dies and render it absolutely impossible for the dies to move backward to the slightest degree. In setting the dies up to place and in adjusting them I employ a screw 49 which is carried by an arm 50 pivoted on a stud 51, and is provided with a hand wheel 52 for convenience in operation. See Fig. 1. It will be noticed in Fig. 6 that the base of each die is provided with a socket 53 which receives the point of the screw. In adjusting, the arm is simply turned into such a position that the point of the screw will pass into the socket in the base of the die which it is desired to set up, and forward rotation of the screw will of course force the die forward, after which it is locked in position in the manner already described.

48 denotes guides one being placed before each die which act to hold the wire against lateral movement and to prevent it from escaping from the dies in use. These guides are locked in position after adjustment by bolts 45 which pass through both heads and guides. In front of the straightening head I place a pair of drawing rolls, the upper roll only appearing in Fig. 1 and being designated by 65. The operation of these drawing rolls being practically identical with that of the feeding and straightening rolls and the construction being common in this class of machines they are not thought to require description and illustration in detail. Motion is transmitted from the main shaft to the drawing rolls by means of a bevel pinion 66 on the main shaft which meshes with a bevel gear 67 on a short shaft 68. This shaft carries a pinion 69 which meshes with a similar pinion, see dotted lines, Fig. 2, on a shaft below shaft 68 which carries the lower drawing roll. These shafts are journaled in suitable castings 70 which are bolted to the bed, the upper shaft being journaled in sliding blocks in the same manner as the upper feeding and straightening roll shafts and said blocks being vertically adjustable by means of screws 71, the ends of said screws only showing in the drawings and said ends being squared to receive a hand wheel 72.

In starting the machine it is simply necessary to introduce the end of the coil of wire into the feeding and straightening rolls, the end of the piece being ordinarily sharpened to enable it to pass into the dies easily. The feeding and straightening rolls will draw it forward without further assistance from the operator the wire being straightened and bends removed as it passes through the feeding and straightening rolls. From these rolls it passes without assistance from the operator into and through the drawing rolls and the straightening head the latter acting to complete and perfect the straightening of the wire and sending it to the operative portion of the machine in condition to be cut up into finished rods or blanks.

54, see Fig. 3, denotes a sleeve which is loose on the main shaft. Commencing at the right as seen in Fig. 3 this shaft carries a clutch member 55, a cam 56 which operates the blank releasing mechanism, a cam 57 which operates the blank gage, a hand wheel 58 for convenience in operating the sleeve when it is not desired to apply power, as for example in timing the cams, a cam 59 which operates the saw slide, a cam 60 which operates the mechanism for returning the saw carriage, and mutilated bevel gears 61 and 62 which operate jaws for gripping the wire. The cams, the hand wheel and the bevel gears are provided with collars 63 which are shown as rigidly locked to the sleeve by means of bolts 64. After leaving the drawing rolls the wire passes through a block or head 73, see Figs. 3 and 21, which is carried by a bracket 74 itself bolted to the saw carriage, which is designated by 75.

76 denotes gripping jaws which move in suitable ways in the face of block 73. The inner faces of these jaws are made concave and are slightly serrated so as to grip the wire firmly but without marring it. These jaws are moved toward or from each other by a right and left threaded screw 77. One end of this screw is connected by a universal joint 78 to one end of a telescopic connecting rod 79, the other end of said rod being connected by a similar universal joint to a shaft 80 journaled in a casting 81 itself rigidly bolted to the body. This shaft receives intermittent rotary movement in opposite directions from mutilated bevel gears 61 and 62 on sleeve 54. The toothed portions of these mutilated bevel gears engage alternately with a bevel pinion 82 on a shaft 84 journaled in casting 81. See Figs. 25 and 26 in connection with Fig. 3. This shaft also carries a pinion 85 which meshes with a pinion 86 having a hub 87 which is mounted on shaft 80 but not rigidly secured thereto.

88, see Figs. 25 and 26, denotes a ratchet on shaft 80 which is engaged by a pawl 89 lying in a slot in hub 87. A spring 90 secured to the hub acts to force the pawl inward into engagement with the ratchet. In the outer end of shaft 80 is a longitudinal recess 91 in which is socketed a rod 92. Near the inner end of this rod is a cross pin 93 which passes through a slot 94 in the shaft and engages a collar 95 adapted to slide on the shaft. Between this collar and hub 87 are washers 96, one of which I have made of German silver, the other of steel, although as a matter of course the material is not essential. The outer end of rod 92 is threaded as at 97 and is engaged by a thumb nut 98. Between the thumb nut and the end of shaft 80 is a spring 99. In the outer face of pinion 86 is a recess 100 the side of which tapers inward as clearly shown in Fig. 25. Within this recess is a circular friction washer 101 and within the washer and keyed to the shaft is a disk 102 the side of which tapers inward to correspond with the taper of recess 100. The outer face of disk 102 rests against a shoulder 103 on the shaft. The action of this construction will be clearly understood from Fig. 25. Collar 95 and rod 92 move longitudinally together, the collar sliding over shaft 80. It will be seen therefore that the action of spring 99 will be to draw rod 92 and sleeve 95 outward and to press shaft 80 inward. As disk 102 is engaged by the shoulder on shaft 80 and as pinion 86 is moved outward by the engagement of collar 95 with the washers which themselves bear on hub 87 it follows that friction washer 101 will be compressed between disk 102 and the wall of the recess in the pinion and that the amount of friction between the pinion and washer and the disk may be regulated by adjustment of thumb nut 98. It is of course well understood that the main shaft is constantly rotating and that sleeve 54 is capable of being connected to the main shaft so as to rotate with it. This portion of the machine I shall presently describe in detail. It is sufficient for the purposes of this special movement that sleeve 54 has intermittent rotary movement.

In Figs. 1, 2, 3, 21, 25, and 26 the parts are shown in a position in which the gripping jaws are about to grip the wire, sleeve 54 being about to commence moving. As soon as the toothed portion of mutilated bevel gear 61 engages bevel pinion 82 motion will be communicated to shaft 80, in the manner already explained and which will be clearly understood from Fig. 25, which by means of the universal joints and telescopic connecting rod 79 rotates right and left threaded screw 77 in the direction of the arrow in Fig. 3 and moves the gripping jaws from the position shown in Figs. 3 and 21 into engagement with the wire, which, as has been fully explained, is being constantly fed forward while the machine is in operation. At the instant that the jaws have gripped the wire firmly the toothed portion of mutilated bevel gear 61 will have passed out of engagement with bevel pinion 82 which will stop the rotation of right and left threaded screw 77 leaving the jaws gripping the wire. From this instant the forward movement of the wire carries the saw carriage, saw slide, saw, &c., forward with it as will presently be fully explained, one part of the telescopic connecting rod sliding over the other while this movement takes place.

It will be understood from Fig. 25 that the motion of jaws 76 in gripping the wire is not positive but is produced through the engagement of friction washer 101 with disk 102 which is keyed to shaft 80, this frictional engagement of the washer and disk, as already stated, being regulated by adjustment of thumb nut 98. In use this nut is tightened up sufficiently to cause friction washer 101 to press upon the disk with sufficient force so that the frictional contact will cause the pinion to carry the shaft under ordinary circumstances but should the wire be gripped with sufficient firmness before the toothed portion of mutilated bevel gear 61 has passed out of engagement with bevel pinion 82 then pinion 86 will be permitted to slip on shaft 80 so that while said pinion must continue to rotate until the toothed portion of mutilated bevel gear 61 passes out of engagement with bevel pinion 82, the shaft itself and with it the right and left threaded screw which operates the gripping jaws will remain stationary, the jaws however, not releasing their grip upon the wire to the slightest extent. If the pinion continues to rotate for an instant after the wire has been gripped pawl 89 will slide backward over the teeth of ratchet 88. This construction does away with all danger of injury to any of the gearing in use and enables the same jaws to be used upon different sizes of wire. After the toothed portion of mutilated bevel gear 61 has passed out of engagement with bevel pinion 82 the parts remain in this position while the blank is being cut off by the saw all of which will presently be fully explained. After the blank has been cut off motion is again communicated to sleeve 54 in the manner which I shall presently explain and bevel pinion 82 is engaged by the toothed portion of mutilated bevel gear 62 and is rotated in the opposite direction, pawl 89 now engaging the ratchet and carrying shaft 80 forward with a positive movement. This rotates right and left threaded screw 77 in the opposite direction from that indicated by the arrow in Fig. 3 and causes the gripping jaws to release the wire with a quick and positive movement. After the dropping of the severed blank the butt end of the piece of wire will move forward at its uniform rate of speed, it being borne in mind that the feeding of the wire is continuous. As the wire moves along it passes through a number of guides each of which consists of a fixed jaw 104 and a movable, in the present instance a swinging, jaw 105.

106, see Figs. 27 and 28 in connection with Fig. 3, is a standard which is rigidly bolted to saw carriage 75. The special shape of this standard is of course immaterial the essential features being that the standard be provided with a fixed jaw 104, an arm 107 to which the swinging jaw is pivoted and an arm 108 carrying a head 109 having an opening 110 which is adapted to receive the free end of a rod 111 the opposite end of which is pivoted to clutch operating lever 112. The guide carried by standard 106 is the first guide through which the wire passes and differs slightly in details of construction from the other guides. The swinging jaw is rigidly secured to a sliding pin 113 which also passes through ears 114 on arm 107. Pin 113 is made considerably longer than the ears through which it passes and is provided at one end, the right as seen in Fig. 3 and the left as seen in Fig. 28, with a head 115 and with an angular socket 116 which is adapted to receive the correspondingly shaped end 117 of releasing rod 118. At the opposite end of pin 113 a collar 119 is rigidly secured. Between head 115 and the ears upon arm 107 is a spring 120, this being simply a cushion spring as will presently be more fully explained. It will be seen from Figs. 3 and 28 that the spring acts to force head 115 away from the ears and that collar 119 acts to retain the pin in place.

Turning now to Figs. 22, 23 and 24 in connection with Figs. 1 and 3, 121 is a bench which is practically a continuation of the bed and may or may not be secured thereto, the bench being made of any required length and resting upon legs 2 in the same manner as the bed.

122 denotes an inclined table which is secured to the legs which support the bench and which receives the severed blanks. The bench is provided in its top with a slot 123 leading into a recess 124.

125, see Figs. 22, 23 and 24, denotes movable standards which rest upon the bench. These standards are provided on their under sides with ribs 126 which engage slot 123 and retain the standards against lateral movement. The standards are secured in place after adjustment by bolts 127 which pass through the bases of the standards and on opposite sides of blocks 128 which lie within the recesses, the heads of the bolts engaging the under sides of the blocks and holding them against the upper wall of the recess. The blocks likewise are provided with ribs 126 which hold them in place and the portions of the bolts which engage the blocks are made angular to hold them against turning. To adjust the standards it is simply necessary to loosen the nuts on the bolts and slide them to the required position. These standards are each provided with a fixed jaw 104 and with an arm 107 to which a swinging jaw 105 is pivoted. The swinging jaws carried by the standards are all (with the exception of the one carried by standard 106) rigidly secured, for example by set screws 129, to releasing rod 118 which passes freely through ears 114 on arms 107. The inner faces of jaws 104 and 105—that is, the faces which receive the wire are all beveled as at 130, see Fig. 18, to permit the end of the wire to enter freely as it is fed along.

131, see Figs. 22, 23 and 24, denotes a gage against which the end of the piece of wire strikes as it is fed forward. This gage is rigidly secured to a sliding rod 132 which turns freely in standards 125, and its adjustment determines the length of the blanks cut from the piece of wire. In the present instance I have shown the gage as secured to the rod by a clamp 133 the gage being made integral with one portion of the clamp. Should it be desired to change the length of the blanks, that is, cut longer or shorter blanks from the piece of wire, it is simply necessary to loosen the clamp and move the gage in either direction as may be required, bench 121 being of course made long enough to provide for all ordinary lengths of blanks. As soon as the end of the piece of wire strikes the gage it moves the latter forward carrying rod 132 with it. This rod as already stated slides freely through standards 125.

134, see Fig. 3, denotes a grooved collar which is rigidly secured to rod 132. At the outer end of clutch lever 112 are arms 135 which carry pins or rollers 136 which engage the groove in collar 134. Clutch lever 112 is pivoted on a standard 137 extending upward from the bed. At the end of clutch lever 112 opposite to arm 135, see Fig. 16, is a ring 138 on the inner face of which are pins or rollers 139 which engage a groove 140 in a clutch member 141 which is secured to shaft 3 by a key 142, the key, however, permitting the clutch member to slide freely on the shaft. This clutch member therefore is always rotating with the shaft.

It will be seen from the above that when the end of the piece of wire strikes the gage the rod 132 will be moved longitudinally which will oscillate the clutch operating lever and throw the sliding clutch member into engagement with fixed clutch member 55 thereby communicating rotary movement to the sleeve.

143, see Fig. 16, denotes a lug on the face of ring 138 which is adapted to be engaged alternately by lugs 144 on clutch member 55, lug 143 being beveled on its under side and lugs 144 being beveled on the corresponding faces so that as soon as either of the lugs 144 comes in engagement with lug 143 the sliding clutch member will be thrown out of engagement with the fixed clutch member thereby stopping rotation of the shaft. As lugs 144 are diametrically opposite each other it follows that each time the clutch members are thrown into engagement sleeve 54 will make a half revolution with the main shaft and at the completion of each half revolution it will be automatically disconnected from the shaft by the lugs. In order to insure that the sleeve shall cease moving the instant the clutch members are disconnected I provide a friction device consisting of two arms 145, see Figs. 29 and 30 in connection with Fig. 3, which are pivoted to a standard 146 extending upward from the bed. The inner faces of these arms are provided with friction pads 147 of leather or any suitable material which are clamped against the sleeve by a set screw 148 which passes through the arms.

Releasing rod 118 is operated from cam 56 on sleeve 54. The shape of this cam is clearly shown in Fig. 18.

149 devotes a lever pivoted to a block 150 which is itself bolted to the bed. This lever carries a roller 151 which is adapted to bear upon the periphery of the cam.

152 denotes a rod one end of which is pivoted to the upper end of lever 149 the other being pivoted to a crank 153 which is rigidly secured to releasing rod 118 in any suitable manner as by a set screw 154.

It will be apparent from Fig. 18 that at a certain period in each complete revolution of sleeve 54 (as a matter of fact during what I shall term in describing the operation of the machine, the second half rotation) cam 56 by engagement with lever 149 will oscillate releasing rod 118 and will throw the swinging jaws from the position shown in Figs. 23 and 27 to the position shown in Fig. 24 and in dotted lines in Fig. 27, the swinging jaws remaining in this position ample time to permit the severed blank to drop out. It should be understod in connection with this movement that at the time it takes place the saw carriage will have moved from the position shown in Fig. 3 to a position in which angular end 117 of the releasing rod will have passed into angular socket 116 in head 115, so that when the releasing rod is oscillated the swinging jaw carried by the saw carriage will be operated with the other swinging jaws. In order to prevent any shock or jar to the machine when this engagement takes place I provide the elongated pin 113 which is cushioned upon spring 120. As soon as the end of the releasing rod strikes the bottom of the socket the spring will yield and prevent any strain upon the machine. The return movement of the swinging jaws is by gravity alone. As soon as cam 56 passes out of engagement with roller 51 the swinging jaws will drop back to their operative position and will hold the wire until they are opened again after another blank has been severed. Rod 132 which carries the gage is operated from cam 57 on sleeve 54. The shape of this cam is clearly shown in Fig. 17.

155 denotes a bell crank lever pivoted to a block 156 itself rigidly secured to the bed. This lever carries a roller 157 which is engaged by the periphery of the cam.

158 denotes a rod one end of which is pivoted to lever 155 the other being pivoted to a crank 159, whose hub 160 has an angular opening through it to receive freely the angular end 161 of rod 132. It will be seen that each inward movement of rod 158 will oscillate the crank and with it rod 132 but that the longitudinal movement of said rod, already explained, is wholly independent of the crank, the rod 132 sliding freely through hub 160.

Cam 57 is so shaped and so timed that at the instant the sawing operation commences it will act to throw the gage from the position shown in Fig. 23 to the position shown in Fig. 24, the position of the cam at the instant this movement is about to commence being shown in Fig. 17. The cam acts to hold the gage in the position shown in Fig. 24 until after the severed blank has been released by the jaws. After the blank has dropped out cam 57 permits the gage to return to the position shown in Fig. 23.

In order that roller 157 shall be held firmly in engagement with the periphery of cam 57 so as to insure prompt return movement of the gage I provide a spring 162 one end of which is connected to rod 158 and the other to a standard 163 extending upward from the bed.

The relation of the movements of sleeve 54 and cam 57 to the gage is as follows: Starting with the gage in the position shown in Fig. 23 the first half rotation of cam 57 moves the gage from that position to the position shown in Fig. 24 and retains it there. During the second half rotation the cam allows the gage to drop back to the position shown in Fig. 23. The third half rotation is like the first. The ends of rods 118 and 132 are supported by a standard 164 which is in all respects identical with standards 125 except that this standard is not movable, being rigidly fixed to a block 165 which is itself secured to the bed. See Figs. 16 and 18. The rods are supported loosely in the standard both being free to turn therein and rod 132 having a sliding movement also as already explained.

I have already explained one mode in which movement is automatically imparted to sleeve 54 and have explained that the movements of said sleeve cease at the completion of each half revolution. I will now explain how movement is again automatically imparted to the sleeve after it has been stopped in the manner already described. I have merely stated heretofore that one end of rod 111 was pivoted to the clutch operating lever. This rod passes through a guide 166 on standard 163 by which said rod is retained in operative position. Near the other end of this rod is an adjustable collar 167 which is adapted to be engaged by head 109. As the carriage and head move forward, as while a blank is being sawed from the piece of wire, the end of rod 111 will pass into opening 110 in the head but when the head itself comes in contact with collar 167 the collar and rod 111 are moved forward which oscillates clutch operating lever 112 and again throws sliding clutch member 141 into engagement with clutch member 55 on sleeve 54 so that motion is again communicated to said sleeve which makes another half revolution, at the completion of which the clutch members are again disengaged in the manner already explained. It will be understood that when this movement of the clutch operating lever takes place rod 132 will also slide longitudinally, the angular end thereof sliding as already explained in hub 160, this movement of rod 132 being alternate with the movement of said rod which is caused by engagement of the wire with the gage. In the former movement, that is when the piece of wire strikes the gage, the movement of the clutch operating lever is caused by rod 132. The present movement of the clutch operating lever however, is caused by the engagement of hub 109 with collar 167 on rod 111, the movement of rod 132 and the gage being wholly idle and said parts returning to their normal position the instant that the clutch members are disengaged as has already been explained.

In order to provide for cutting off the rough end of a new piece of wire so that the blanks will all be perfect I provide means for actuating the clutch operating lever by hand so that the saw will cut off the rough end of a new piece of wire and then return to its normal position, after which the smooth end of the wire will strike the gage and from this time on the automatic movements of the machine take place in the manner already described.

168 is a vertical lever pivoted on a stump 169 extending outward from block 165. The upper end of this lever is pivoted to clutch operating lever 112. The lower end of this lever extends down through the bed as clearly shown in Fig. 18.

170 denotes a rod extending longitudinally under the bed. See Figs. 2 and 18 and dotted lines in Fig. 3. The rear end of this lever is pivoted to an arm 171 extending from a transverse shaft 172 shown only in dotted lines in Fig. 3. At the front end of shaft 172 is a hand lever 173. See Figs. 1 and 3. This hand starting device is provided simply for convenience in cutting off the rough end of a new piece of wire.

As already stated after the smooth end of the wire has once come in contact with the gage the automatic movements of the machine will proceed without interruption until the entire coil of wire is cut up into blanks.

In order to provide for opening the guide jaws independently of cam 56 as for example when a coil of wire has run out leaving a short end in the machine, I provide a hand lever 174, see Figs. 3 and 17, to operate releasing rod 118. This hand lever is provided with a hub 175 which is locked to the rod in any suitable manner as for example by a set screw as shown in Fig. 17.

Turning now to Figs. 9 to 15 inclusive in connection with Figs. 3, 19 and 20 I will describe the operation of the saw carriage and saw slide. The saw carriage I have already designated as 75. This carriage rests upon a plate 176 which is secured to the bed by screws 177. In order to hold the plate firmly against lateral movement a rib 178 is formed upon the bed which engages a corresponding groove in the plate. In use the carriage slides longitudinally upon this plate. The carriage is made widest at the center as clearly shown in Figs. 3 and 15 and is provided with ways 179 which receive plate 176, one edge of the plate being preferably undercut as shown in Fig. 15. The other edge of the plate I preferably leave straight and between the plate and the way I place gibs 180 which may be adjusted by set screws 181 to take up lost motion. This construction is adopted in order to insure perfectly smooth movement of the carriage at all times. The forward movement of the carriage, that is, the movement from left to right as seen in Fig. 3, is caused by the feeding of the wire. As already explained the wire is gripped by jaws 76 seated in a block or head 73 carried by a bracket 74 which is itself rigidly secured to the carriage. See Figs. 3 and 14. It is obvious that as soon as the wire has been gripped by these jaws the forward movement of the wire will cause forward movement of the carriage, connecting rod 79 telescoping as already explained as the carriage moves forward. During the forward movement of the carriage the saw is moved into operative position and severs the blank. This movement I shall presently describe in detail but will first describe the mechanism for returning the saw carriage to its normal position, that is, to the position shown in Fig. 3. In the under side of the saw carriage, see Figs. 12 and 13, is a recess 182 and upon one of the side walls of the recess is a rack 183. This rack is adapted to be engaged by pinion 184 carried by a vertical shaft 185 which is journaled in a hub 186 on a slide 187 adapted to move in ways 188 upon the under side of the bed. These ways are formed in plates 189 secured to the under side of the bed, one only of said plates appearing in the drawings. See Fig. 10. Hub 186 lies in an opening 190 in the bed and in plate 176, this opening showing clearly in Figs. 10, 12 and 13. At the lower end of shaft 185 is a bevel pinion 191 which meshes with a bevel pinion 192 carried by a horizontal shaft 193. Pinion 192 is formed integral with or rigidly secured to a sleeve 194, see Fig. 11, which is itself journaled in a bearing 195 forming part of slide 187. The inner end of the sleeve is threaded and is engaged by a nut 196 which bears against the side of the bearing opposite to the hub of pinion 192. Shaft 193 is provided with a rib 197 which engages a corresponding groove in the sleeve so as to permit the sleeve and pinion 192 to slide freely on the shaft when the slide and bearing are moved, it being understood of course that the slide, bearing and hub always move together, so that the bevel pinions and pinion 184 are always in rotation, shaft 193 receiving movement directly from the main shaft as I will now explain. The other end, that is the outer end, of shaft 193 is journaled in a bearing 198 secured to the under side of the bed. At the outer end of this shaft is a bevel pinion 199 which meshes with a bevel pinion 200 on a longitudinal shaft 201 lying under the bed, one end of said shaft being journaled in a bearing 202 secured to the under side of the bed, the other end being journaled in a bearing 203 secured to one of the legs. See Fig. 2. At the opposite end of shaft 201 from the bevel pinion is a gear wheel 204 which meshes with a gear wheel 205 on main shaft 3. See Fig. 1 in connection with Fig. 2. It will be seen therefore that all the pinions just described are constantly rotating but pinion 184 is not in engagement with the rack except when placed there by movement of the slide in the manner which I will now explain.

206 denotes a slide adapted to move transversely in suitable ways in a block 207 secured to the bed. See Fig. 2 in connection with Figs. 3 and 10.

208 denotes standards on slide 206 each of which carries a roller 209 bearing upon the periphery of cam 60 on sleeve 54.

Slides 187 and 206 are connected by means of an arm 210 which forms part of slide 187 and a rod 211. One end of this rod is threaded as shown in Fig. 10 and passes through arm 210 the two slides being adjusted relatively to each other by nuts 212 which engage the opposite sides of the arm. In order to avoid the possibility of breakage of parts should the teeth of pinion 184 fail to mesh with the teeth of the rack and to avoid any strain upon the parts under any circumstances I provide a yielding connection between rod 211 and slide 206.

213 denotes a socket in slide 206. At the outer end of this socket is a screw plug 214 through which the rod passes freely. At the inner end of said rod is a head 215 and between this head and the inner end of the screw plug is a spring 216. It will be seen that should slide 187 fail for any reason to respond instantly to the movement of slide 206 the spring will yield and will prevent any injury to the parts of the machine.

The shape of cam 60 is clearly shown in Fig. 10 in which it will be seen that the raised portion of the periphery of said cam is about to engage the left roller 209 the effect of which will be to move the slides toward the left from the position shown in Fig. 10, and retain them there until the beginning of the next half rotation of sleeve 54 and the cam. When the cam commences to move again the raised portion of its periphery engages the right roller 209 and moves the slides again to the position in which they appear in Fig. 10, the cam stopping in the position shown in said figure. In other words during one half rotation of sleeve 54 and cam 60, say for example the first half rotation, the parts are moved into the position shown in Fig. 10. During the next, i. e., the second half rotation the raised portion of the periphery of the cam starting from a position of rest as in Fig. 10 will engage the left roller 209, will move the slides toward the left and will place pinion 184 in engagement with the rack, this position of the parts being clearly shown in Fig. 13, and it being understood of course that the carriage has moved to the position shown in Fig. 13 by the forward movement of the wire after it has been gripped by jaws 76 as already described. As soon as the pinion engages the rack the pinion being always rotating it follows that the carriage will be moved toward the left from the position shown in Fig. 13 back to its normal position as shown in Fig. 12, the backward movement ending when the pinion runs out of the rack. During the next, i. e., the third half rotation of the cam, the right roller 209 will be engaged by the raised portion of the periphery of the cam, the two slides will be moved toward the right and pinion 184 will be moved out of engagement with the rack and retained there, this position of the pinion being also shown in Fig. 12. While the parts are in this position the saw carriage will be moving forward again and the saw will be in operation. At the commencement of the next, i. e., the fourth half rotation of the sleeve, the raised portion of the periphery of the cam will again engage the left roller 209, will move the slides toward the left again and will consequently place the pinion again in engagement with the rack and the saw carriage will be again returned to its normal position. During the next, i. e., the fifth half rotation of the sleeve, the operations just described as taking place during the third half rotation will be repeated, and so on.

217 denotes the saw, which is carried by a shaft 218 journaled in boxes 219 on standards 220 extending upward from a plate 221 which is itself adapted to slide for the purpose of adjustment on a plate 222. This plate is formed integral with or rigidly secured to the saw slide 223. Plate 222 acts to hold plate 221 against lateral movement, plate 221 being locked in position after adjustment by bolts 224 which pass through slots 225 in said plate. Motion is imparted to the saw independently of the other parts of the machine by a belt 226 which extends from a suitable belt pulley on a counter shaft, neither counter shaft nor pulley being shown, and passes around a belt pulley 227 on shaft 218.

Reciprocatory movement transversely to the saw carriage is imparted to the saw slide in the manner which I will now describe. The rear end of the saw slide extends backward as at 228 and carries a roller 229. This roller engages a groove 230 in a lever 231, one end of which is pivoted on a standard 232 extending upward from the bed, the other end lying in a recess 233 in a casting 234 which is bolted to the bed.

235 denotes a slide adapted to move transversely in suitable ways in block 207, and the forward end of which is pivoted to lever 231 as at 247. See Fig. 2 in connection with Figs. 3 and 9.

236 denotes standards on slide 235 each of which carries a roller 237 which is adapted to bear on the periphery of cam 59 on sleeve 54. The shape of cam 59 is clearly shown in Fig. 9.

Continuing the general plan of description heretofore used, the first half rotation of sleeve 54 will have placed cam 59 in the position shown in Fig. 9, this view corresponding with Fig. 3 and indicating the position of the cam when the second half rotation is about to take place. The slides and standards however, are not in the position they occupy when the movement commences. Suppose now that the parts have been carried to the position shown in Fig. 9 by the first half rotation. The instant lever 231 is moved to the position shown in Figs. 3 and 9, it is locked there by a latch 238 which is pivoted to a cap piece 239 which covers recess 233 in the casting. This lever is retained in the locking position by a weight 240 under the bed attached to a cord 241 which passes up through the bed and is connected to the end of the latch. See Fig. 9 in connection with Figs. 2 and 20. The inner end of latch 238 is provided with a rounded head 242 which is adapted to be engaged by head 109 on standard 106. As already stated head 109 is moved forward with the saw carriage by the movement of the wire. The instant head 109 engages head 242 head 109 will ride over head 242 and will depress the inner end of the latch the effect of which is to release lever 231. The instant this lever is released the lever, slide 235 and the saw slide are drawn toward the left from the position in which they are shown in Fig. 9 by a weight 243 attached to a cord 244 which passes over a pulley 245 journaled in a bracket 246 secured to the bed, and is secured to slide 235. See Figs. 1 and 9. This movement of course moves the left roller 237 away from cam 59 and places the right roller 237 in engagement with the cam, this position of the standards and rollers not being shown in the drawings. An instant later head 109 will engage collar 167 on rod 111 and will oscillate the clutch operating lever and place the clutch members in engagement. The instant this movement is effected the second half rotation of sleeve 54 and the parts carried thereby takes place. This second half rotation of cam 59 produces no movement whatever of slide 235 as will be apparent from Fig. 9, it being understood of course that before the movement of the cam takes place the left roller 237 will have been moved toward the left far enough so that the slide will not be affected by the movement of the cam and the right roller 237 will be in engagement with the reduced portion of the cam and will not be moved thereby. This second half rotation of sleeve 54 and the parts carried thereby, as already explained, will place pinion 184 in engagement with the rack and will move the saw carriage back to its normal position, that is, the position shown in Figs. 3 and 12. The third half rotation of sleeve 54 and the parts carried thereby is the same as the first and will move slide 235 and lever 231 again to the position shown in Figs. 3 and 9. It will be seen in Fig. 3 that lever 231 lies obliquely to the plane of the main shaft and sleeve, the forward, i. e., the free end of said lever lying inward toward the line of feed of the wire so that simultaneously with the forward movement of the saw carriage the saw slide will be moved inward transversely to the saw carriage through the engagement of roller 229 with the groove in the lever. While this movement is taking place a blank is being severed from the piece of wire by the saw. The sawing operation is of course finished before head 109 comes into engagement with head 242 of the latch which holds lever 231. As soon as this engagement takes place the latch is tilted as already described and releases the lever. The instant the lever is released weight 243 moves slide 235, the lever and the saw slide and saw backward away from the line of movement of the wire. An instant later head 109 engages collar 167, places the clutch members in engagement and produces a half rotation of sleeve 54 and the parts carried thereby which places pinion 184 in engagement with the rack and returns the saw carriage and saw slide to their normal, i. e., their starting position again.

I will now describe the operation of the machine as a whole.

The operations of the feeding and straightening mechanisms will be clearly understood from the description already given, it being borne in mind that the feeding of the wire is continuous.

The movement of the feeding mechanism is received from the main shaft but is wholly independent of the half rotations of sleeve 54. The straightening head and saw receive motion from suitably arranged counter shafts it being immaterial so far as my present machine is concerned just how these motions are imparted. Starting now with a clear understanding that the saw is continuously in rotation and that the feeding of the wire is continuous it must be borne in mind that all of the other mechanisms receive their movement from sleeve 54, and that this sleeve receives intermittent rotary motion from the main shaft which itself moves continuously, the clutch members and parts acting in connection therewith being actuated automatically in such a manner that the sleeve makes an exact half rotation, stops, then makes another half rotation, stops, makes a third half rotation and so on. After passing through the feeding and straightening rolls, the straightening head and the drawing rolls, the wire passes through a block or head 73 containing gripping jaws, which however do not yet grip the wire, then through a number of guides each containing a fixed jaw and a movable jaw and finally comes in contact with the gage 131 on a rod 132, the adjustment of which determines the length to which the blanks are cut. As soon as the end of the piece of wire comes in contact with the gage, see Figs. 22, 23 and 24 in connection with Fig. 3, the gage and rod will move forward oscillating clutch operating lever 112 and throwing the clutch members into engagement which communicates the motion of the main shaft, to sleeve 54 and produces the first half rotation of said sleeve. This first half rotation of the sleeve produces the following movements in the several mechanisms comprised in the machine: Through the action of cam 57, bell crank lever 155, rod 158 and crank 159, rod 132 is oscillated the effect of which is to throw the gage from the position shown in Fig. 23 to the position shown in Fig. 24, and retain it there. This permits the wire to move forward freely, any number of guides that may be necessary being provided to support the wire as it is fed forward. Simultaneously with the movement just described, through the action of mutilated bevel gear 61, shaft 80, and the parts operating in connection therewith, gripping jaws 76 are caused to grip the wire firmly. As these jaws are upon the saw carriage it follows that the saw carriage and the parts upon it will be carried forward by the movement of the wire simultaneously with the movements just described. Through the action of cam 59, slide 235 and parts operating in connection therewith, lever 231 and the saw slide are moved to the position shown in Figs. 3 and 9, lever 231 being locked in this position by the latch so that simultaneously with the forward movement of the saw carriage the saw slide carrying the saw is caused to move transversely to the line of movement of the saw carriage and sever the blank from the piece of wire while the carriage is moving. An instant after the saw has severed the blank, head 109 will engage head 242 which will tilt the latch and release lever 231 the latter being instantly moved backward by the weight, carrying the saw back out of the line of movement of the wire. An instant later head 109 will engage collar 167, carry rod 111 forward, oscillate clutch operating lever 112 again and a second time place the clutch members in engagement which will produce the second half rotation of sleeve 54 and the parts carried thereby. This second half rotation of the sleeve produces the following movements in the several mechanisms comprised in the machine: Through the action of mutilated bevel gear 62, shaft, 80 and the parts operating in connection therewith, gripping jaws 76 are caused to release their grip upon the wire leaving the saw carriage free to be moved back to its normal position, that is, the position shown in Fig. 3, the jaws sliding over the wire during the backward movement. Practically simultaneously with the release of the wire by jaws 76 through the action of cam 60, slide 206, and the parts operating in connection therewith, pinion 184 is placed in engagement with the rack in the saw carriage and the latter is returned to its normal position, it being understood that the pinion is always rotating so that the instant the rack is engaged movement is communicated to the carriage. See Figs. 12 and 13 in connection with Fig. 3. Simultaneously with these movements and through the action of cam 56 lever 149, rod 52 and the parts operating in connection therewith, releasing rod 118 is oscillated which opens all of the swinging jaws simultaneously and permits the severed blank to drop out, the swinging jaws dropping back to their normal position an instant after the release of the rod. Simultaneously with these movements, through the action of cam 57, bell crank lever 155, rod 158, and crank 159, the gage will be moved from the position shown in Fig. 24 to the position shown in Fig. 23. The end of the piece of wire now passes through the guides as before and comes in contact with the gage which through the connecting mechanisms already described at length, places the clutch members in engagement which produces a third half rotation of sleeve 54, this half rotation being identical in every respect with the first, and each complete rotation of said sleeve producing a severed blank of the predetermined length.

In order to provide that the first blank severed from the piece of wire shall have a smooth end thereby preventing imperfect blanks I provide hand starting mechanism by which I am enabled to produce the first half rotation of the sleeve without waiting for the end of a new piece of wire to come in contact with the gage. This movement causes a short end of wire to be cut off and drop out, the second and all succeeding half rotations of the sleeve being automatic as already described and the production of the first half rotation by hand being simply for the purpose of cutting off the rough end of a new piece of wire.

Having thus described my invention, I claim—

1. In a mechanism of the character described the combination with a series of rolls arranged to serve both as feeding and straightening rolls, of a rotary straightening rolls, of a rotary straightening head through which the wire passes after leaving the feeding and straightening rolls.

2. The combination with a series of rolls arranged to serve both as feeding and straightening rolls, of a rotary straightening head through which the wire passes after leaving the feeding and straightening rolls and a pair of drawing rolls placed in advance of the rotary head.

3. The combination with a series of rolls arranged to serve both as feeding and straightening rolls, and a rotary straightening head through which the wire passes after leaving the feeding and straightening rolls, of carriage 75, jaws upon said carriage, and suitable mechanism for causing the jaws to grip the wire.

4. The combination with suitable wire feeding and straightening mechanism, of carriage 75 and jaws upon said carriage which are adapted to grip the wire so that the carriage will be moved forward by the wire when the jaws are in the gripping position.

5. The combination with suitable wire feeding and straightening mechanism, of carriage 75, jaws upon said carriage which are adapted to grip the wire, and a saw carried by a slide 223 adapted to move transversely to the carriage, by which blanks are severed while the carriage is moving forward.

6. The combination with suitable wire feeding and straightening mechanism, of carriage 75, jaws upon said carriage which are adapted to grip the wire, a saw carried by a slide 223 adapted to move transversely to the carriage by which blanks are severed while the carriage is moving forward, guides each consisting of a fixed jaw, and a movable jaw through which the wire passes, and suitable mechanism which operates the movable jaws simultaneously to release the blank after it has been severed by the jaw.

7. The combination with suitable wire feeding and straightening mechanism, of carriage 75, jaws upon said carriage, which are adapted to grip the wire, a saw carried by a slide 223 adapted to move transversely to the carriage by which blanks are severed while the carriage is moving forward, and a gage 131 against which the end of the piece of wire strikes as it is fed forward and which determines the length of the blanks.

8. The combination with suitable wire feeding and straightening mechanism, of carriage 75, jaws upon said carriage which are adapted to grip the wire, oscillating shaft 80, right and left threaded screw 77 by which the jaws are actuated and a telescopic connecting rod and universal joints by which the oscillation of the shaft is communicated to the screw to open and close the jaws.

9. The combination with carriage 75, jaws upon said carriage adapted to grip the wire, a saw mounted on a slide 223 adapted to move transversely to the carriage, guides through which the wire passes and which are adapted to release the severed blanks, an adjustable gage by which the length of the blanks is determined, the main shaft, a sleeve journaled thereon, clutch mechanism by which the main shaft and the sleeve are connected, suitable mechanism for disconnecting the sleeve at the completion of each half rotation, and suitable mechanism intermediate the sleeve, and the gripping jaws carriage 75 slide 223 the guides and the gage by which said parts are actuated.

10. The combination with the main shaft and sleeve 54 journaled thereon and provided with clutch member 55 having beveled lugs 144, of clutch member 141 keyed to the main shaft but adapted to move longitudinally thereon, and clutch operating lever 112 having ring 138 provided with lug 143 said lever and ring acting to move clutch member 141 into engagement with clutch member 55 whereby the latter and the sleeve are caused to rotate with the main shaft until said parts are disconnected by the engagement of one of the lugs 144 with lug 143.

11. The combination with the main shaft, and sleeve 54 journaled thereon and provided with clutch member 55 having beveled lugs 144, of clutch member 141 on the main shaft, clutch operating lever 112, and ring 138 having lug 143 for placing the clutch members in engagement so that the sleeve will rotate with the main shaft until said parts are disconnected by the engagement of one of the lugs 144 on clutch member 55 with lug 143 on the ring and a friction device consisting of arms 145 carrying pads which are clamped against the sleeve to stop the rotation of the latter the instant the clutch members are disengaged.

12. The combination with wire feeding mechanism, carriage 75 and jaws upon said carriage which grip the wire, of the main shaft, sleeve 54 journaled thereon and provided with a clutch member 55, clutch member 141 on the main shaft, and connections intermediate said clutch member and the carriage whereby the clutch members are caused to engage when the carriage has reached a certain position in its forward movement.

13. The combination with wire feeding mechanism, carriage 75 and jaws upon said carriage which grip the wire, of the main shaft, sleeve 54 journaled thereon and provided with a clutch member 55, a clutch member 141 on the main shaft, sliding rod 132 carrying a gage 131 which is adapted to be engaged by the end of the piece of wire to determine the length of the blanks and which is moved forward with said rod by the wire, and mechanism intermediate clutch member 141 and said rod whereby the clutch members are placed in engagement by the forward movement of the wire.

14. The combination with wire feeding mechanism, carriage 75, jaws upon said carriage which grip the wire and a saw adapted to sever the blanks, of the main shaft, sleeve 54 journaled thereon and having a clutch member 55 provided with lugs 144, clutch member 141 on the main shaft, ring 138 having a lug 143 adapted to be engaged by the lugs on clutch member 55 to disengage the clutch members at the completion of each half rotation, sliding rod 132 carrying a gage 131 which is adapted to be engaged by the end of the piece of wire to determine the length of the blanks and which is moved forward with said rod by the wire, mechanism intermediate clutch member 141 and said rod whereby the clutch members are placed in engagement by the forward movement of the wire to cause a half rotation of the sleeve and connections intermediate clutch member 141 and the carriage whereby the clutch members are placed in engagement by the carriage to cause the second half rotation of the sleeve.

15. The combination with wire feeding mechanism, and carriage 75 carrying jaws which grip the wire and a head 109, of the main shaft, sleeve 54 journaled thereon and provided with a clutch member 55, clutch member 141 on the main shaft, clutch operating lever 112, and rod 111 pivoted thereto and carrying an adjustable sleeve 167, which is adapted to be engaged by head 109 each time the carriage moves forward whereby clutch member 141 is caused to engage the other clutch member and connect the sleeve with the main shaft.

16. The combination with wire feeding mechanism, and carriage 75 carrying jaws which grip the wire and a head 109 having an opening 110, of the main shaft, sleeve 54 journaled thereon and provided with a clutch member 55, clutch member 141 on the main shaft, clutch operating lever 112, vertical lever 168, and rod 111 pivoted to levers 112 and 168 and carrying an adjustable sleeve 167, the end of said rod being adapted to pass into opening 110 in head 109 until said head engages the collar, said rod being then moved forward by the head whereby the clutch operating lever is oscillated and the clutch members placed in engagement.

17. The combination with wire feeding mechanism, and carriage 75 carrying jaws which grip the wire and a saw by which the wire is cut, of the main shaft, sleeve 54 journaled thereon and provided with a clutch member 55, mechanism intermediate said sleeve and the carriage by which the saw is moved into operative position, clutch member 141 on the main shaft, clutch operating lever 112, vertical lever 168, rod 111 pivoted to levers 112 and 168, rod 170 pivoted to lever 168, hand lever 173 and connections whereby the clutch members may be placed in engagement by the hand lever and the saw moved into position to cut off the end of the piece of wire.

18. The combination with wire feeding mechanism, carriage 75 and jaws upon said carriage which grip the wire, of the main shaft, sleeve 54 journaled thereon and provided with a clutch member 55, a clutch member 141 on the main shaft, sliding rod 132 carrying a gage 131 which is adapted to be engaged by the end of the piece of wire to determine the length of the blanks and which is moved forward with the rod by the wire, mechanism intermediate clutch member 141 and said rod whereby the clutch members are placed in engagement by the forward movement of the wire and mechanism intermediate said sleeve and said rod whereby the latter is oscillated to move the gage out of operative position.

19. The combination with wire feeding mechanism, carriage 75 and jaws upon said carriage which grip the wire, of the main shaft, sleeve 54 journaled thereon and provided with a clutch member 55, a clutch member 141 on the main shaft, sliding rod 132 having a grooved collar 134 and carrying a gage 131 which is adapted to be engaged by the end of the piece of wire to determine the length of the blanks and which is moved forward with said rod by the wire, clutch operating lever 112 having arms which engage said collar and a ring which engages clutch member 141 whereby the clutch members are placed in engagement by the forward movement of the rod, and mechanism intermediate said sleeve and said rod whereby the latter is oscillated to move the gage out of operative position.

20. The combination with wire feeding mechanism, carriage 75, jaws 76 carried thereby and a right and left threaded screw engaging said jaws, of the main shaft, sleeve 54 journaled thereon, suitable mechanism intermediate the main shaft and sleeve 54 whereby half rotations are imparted to the latter and mechanism intermediate said sleeve and the right and left threaded screw whereby oscillations in opposite directions are imparted to the screw to cause the jaws to grip and release the wire.

21. The combination with wire feeding mechanism, carriage 75, jaws 76 carried thereby and a right and left threaded screw engaging said jaws, of the main shaft, sleeve 54 journaled thereon and carrying mutilated bevel gears 61 and 62, suitable mechanism intermediate the main shaft and sleeve 54 whereby said shaft and said sleeve are connected and disconnected, shaft 84 carrying a bevel pinion 82 adapted to engage the mutilated bevel gears alternately and a pinion 85, shaft 80 carrying a pinion 86 meshing with pinion 85 whereby movements in oppositie directions are imparted to shaft 80, and universal joints and a telescopic connecting rod 79 by which the movements of shaft 80 are communicated to the right and left threaded screw.

22. The combination with the carriage, jaws 76 carried thereby, right and left threaded screw 77 by which they are operated, shaft 80 and connections intermediate said shaft and the screw by which the movements of the former are communicated to the latter, sleeve 54 carrying mutilated bevel gears 61 and 62, shaft 84 carrying a bevel pinion 82 adapted to engage the mutilated gears and a pinion 85, pinion 86 loosely mounted on shaft 80, a pawl and ratchet connection between said pinion and said shaft by which positive movement is communicated to the shaft and a frictional connection intermediate said shaft and said pinion by which movement in the opposite direction is communicated to said shaft so that the jaws are opened with a positive movement but in the closing movement the pinion may slip on the shaft after the wire has been gripped by the jaws.

23. The combination with sleeve 54 carrying mutilated bevel gears 61 and 62, shaft 84 carrying a bevel pinion adapted to engage the mutilated gears and a pinion 85, of shaft 80 having a ratchet 88, a recess 91, a slot 94 and a shoulder 103, pinion 86 meshing with pinion 85 and having a tapering recess 100, a hub 87 journaled on the shaft, a spring actuated pawl in said hub adapted to engage the ratchet to communicate the movement of the pinion in one direction to the shaft, rod 92 lying in said recess and carrying a cross pin 93 which passes through said slot and engages a collar 95 adapted to slide on the shaft, tapering disk 102 keyed to the shaft and bearing against the shoulder, a friction washer between said disk and recess 100, nut 98 on said rod and a spring bearing on said nut and on the end of the shaft the action of which is to press the disk against the friction washer and communicate the movement of said pinion to the shaft in the opposite direction.

24. The combination with wire feeding mechanism, the carriage, jaws 76 mounted thereon, mechanism for opening and closing said jaws, intermediate connecting mechanism which carries the carriage forward after the wire has been gripped by the jaws and a saw mounted on the carriage, of guides through which the wire passes, each guide consisting of a fixed jaw and a movable jaw, and mechanism for operating the movable jaws to release each blank after it has been severed by the saw.

25. The combination with wire feeding mechanism, the carriage, jaws 76 mounted thereon, mechanism for opening and closing said jaws, intermediate connecting mechanism which carries the carriage forward after the wire has been gripped by the jaws and a saw mounted on the carriage, of bench 121, movable standards 125 attached to said bench to provide for different lengths of blanks, guides mounted on said standards, each guide consisting of a fixed jaw and a movable jaw, and mechanism for operating the movable jaws to release each blank after it has been severed by the saw.

26. The combination with wire feeding mechanism, the carriage, jaws 76 mounted thereon, mechanism for opening and closing said jaws, intermediate connecting mechanism which carries the carriage forward after the wire has been gripped by the jaws and a saw mounted on the carriage, of guides through which the wire passes, each guide consisting of a fixed jaw and a movable jaw, releasing rod 118 to which the movable jaws are rigidly secured, and mechanism for oscillating said rod to operate the movable jaw simultaneously.

27. The combination with wire feeding mechanism, the carriage, jaws 76 mounted thereon, mechanism for opening and closing said jaws, intermediate connecting mechanism which carries the carriage forward after the wire has been gripped and a saw mounted on the carriage, of standard 106, a guide through which the wire passes and which consists of a fixed jaw and a movable jaw, said movable jaw being secured to a pin 113 adapted to turn in said standard, said pin having a head 115 with an angular socket 116, standards 125 carrying similar guides, releasing rod 118 journaled in said standards by which the movable jaws are carried, said rod having an angular end adapted to engage socket 116 when the carriage moves forward and mechanism for oscillating said rod to operate the movable jaws carried by standards 106 and 125 simultaneously.

28. The combination with wire feeding mechanism, the carriage, jaws 76 mounted thereon, mechanism for opening and closing said jaws, intermediate connecting mechanism which carries the carriage forward after the wire has been gripped by the jaws and a jaw mounted on the carriage, of standard 106, a guide through which the wire passes and which consists of a fixed jaw and a movable jaw, said movable jaw being secured to a sliding pin 113 adapted to turn in said standard and said pin having a head 115 with an angular socket 116 and a collar 119, a spring 120 bearing against head 115 and the standard, standards 125 carrying similar guides, releasing rod 118 journaled in said standards by which the movable jaws are carried, said rod having an angular end adapted to engage socket 116 when the carriage moves forward, the spring acting as a cushion to prevent shock to the machine, and mechanism for oscillating said rod to operate the movable jaws carried by standards 106 and 125 simultaneously.

29. The combination with wire feeding mechanism, the carriage, gripping jaws and saw, of the guides consisting of fixed and movable jaws, releasing rod 118 by which the movable jaws are operated, sleeve 54 carrying cam 56, and mechanism intermediate said cam and said rod by which the latter is oscillated.

30. The combination with wire feeding mechanism, the carriage, gripping jaws and saw, of the guides consisting of fixed and movable jaws, releasing rod 118 by which the movable jaws are operated and which is provided with a crank 153, sleeve 54 carrying cam 56, lever 149 adapted to be oscillated by the cam, and a rod 152 connected to said lever and to cam 153 by which rod 118 is oscillated to throw the movable jaws to the open position and release the severed blanks.

31. The combination with wire feeding mechanism, the carriage, gripping jaws and saw, of guides consisting of fixed and movable jaws, and a gage 131 against which the end of the piece of wire strikes to determine the length of the blanks.

32. The combination with wire feeding mechanism, the carriage, gripping jaws and saw, of guides consisting of fixed and movable jaws, gage 131, rod 132 by which the gage is carried and which is provided with a crank 159, sleeve 54 carrying cam 57, bell crank lever 155 which is adapted to be engaged by said cam, rod 158 connected to the bell crank lever and the crank by which the rod is oscillated to move the gage out of operative position, and a spring 162 by which the bell crank lever is held in engagement with the cam.

33. The combination with wire feeding mechanism, the carriage, gripping jaws and saw, of gage 131 which is adapted to be engaged by the end of the piece of wire and moved forward thereby, sliding rod 132 by which the gage is carried, the main shaft, sleeve 54 journaled thereon, clutch operating mechanism adapted to be operated by the sliding rod, and mechanism intermediate the sleeve and the sliding rod for oscillating the latter to throw the gage out of operative position after the blank has been severed.

34. The combination with wire feeding mechanism, the carriage and jaws which grip the wire, so that the carriage will be moved forward by the wire when the latter is gripped by the jaws, of a saw mounted on a slide moving transversely to the carriage, and suitable mechanism for moving the saw into operative position as the carriage is moved forward.

35. The combination with wire feeding mechanism, the carriage and jaws which grip the wire so that the carriage will be moved forward by the wire when the latter is gripped by the jaws, of a saw mounted on a slide moving transversely to the carriage, sleeve 54, mechanism for imparting intermittent half rotations to the sleeve, and mechanism intermediate said sleeve and the slide by which the saw is moved into operative position by each alternate actuation of the sleeve.

36. The combination with wire feeding mechanism, the carriage and jaws which grip the wire so that the carriage will be moved forward by the wire when the latter is gripped by the jaws, of a saw mounted on a slide adapted to move transversely to the carriage, and carrying a roller 229, and a lever 231 adapted to lie obliquely to the line of movement of the carriage its forward end lying inward so that as the carriage is moved forward the slide will be moved forward transversely to the line of movement of the carriage thereby moving the slide forward and carrying the saw into operative position.

37. The combination with wire feeding mechanism, the carriage and jaws which grip the wire so that the carriage will be moved forward by the wire when the latter is gripped by the jaws, of a saw mounted on a slide adapted to move transversely to the carriage and carrying a roller 229, a lever 231 having a groove 230 which is engaged by the roller, mechanism for swinging the forward end of said lever inward toward the line of movement of the carriage, and a latch for locking the lever in said position so that as the carriage is moved forward the slide will be moved transversely to the line of movement of the carriage.

38. The combination with wire feeding mechanism, the carriage having a head 109, and jaws which grip the wire, of a saw mounted on a slide which moves transversely to the carriage and is provided with a roller 229, a lever 231 having a groove engaged by said roller, mechanism for swinging the forward end of said lever inward toward the line of movement of the carriage, and a latch for locking said lever in this position, said latch being provided with a head 242 which is engaged by head 109 when the carriage reaches the extreme of its forward movement whereby the latch is tilted and the lever is released.

39. The combination with wire feeding mechanism, the carriage and jaws which grip the wire, of a saw mounted on a slide which moves transversely to the carriage and is provided with a roller 229, a lever 231 having a groove engaged by said roller, sleeve 54, mechanism for imparting intermittent half rotations to the sleeve, mechanism intermediate said sleeve and the lever by which the forward end of said lever is swung inward toward the line of movement of the carriage, a latch for locking the lever in this position, and means for tilting the latch to release the lever when the carriage has reached the end of its forward movement.

40. The combination with wire feeding mechanism, the carriage and jaws which grip the wire, of a saw mounted on a slide which moves transversely to the carringe and is provided with a roller 229, a lever 231 having a groove engaged by said roller, sleeve 54, mechanism for imparting intermittent half rotations to the sleeve, slide 235 pivotally connected to the lever, a cam on said sleeve which moves the slide forward and swings the forward end of the lever inward toward the line of movement of the carriage, a latch for locking the lever in this position, suitable means for releasing the lever when the carriage has reached the end of its forward movement, and means for returning the slide and lever to their normal position.

41. The combination with wire feeding mechanism, the carriage, jaws thereon adapted to grip and release the wire, and a slide carrying a saw and a roller 229, and adapted to move transversely to the carriage, of a lever 231, having a groove engaged by said roller, sleeve 54 carrying a cam 59, mechanism for imparting intermittent half rotations to the sleeve and cam, slide 235 pivotally connected to said lever, standards on said slide which are engaged by the cam, a latch 238 which is adapted to engage the lever, and a weight acting to move the slide outward, each alternate actuation of the cam acting to move the slide inward carrying the inner end of the lever, in which position it is locked by the latch so that as the carriage moves forward the slide and saw will be moved inward transversely thereto, said latch being released when the carriage reaches its forward position, so that the slide and lever will be returned to their normal position by the weight.

42. The combination with wire feeding mechanism, the carriage having a rack 183, and jaws which grip the wire so that the carriage will be carried forward by the wire when the latter is gripped by the jaws, of a pinion 184 adapted to engage the rack to return the carriage to its normal position after the forward movement, and suitable mechanism for moving the pinion into operative position.

43. The combination with wire feeding mechanism, the carriage having a rack 183, and jaws which grip the wire so that the carriage will be carried forward by the wire when the latter is gripped by the jaws, of a pinion 184 adapted to engage the rack to return the carriage to its normal position after the forward movement, sleeve 54, mechanism for imparting intermittent half rotations to the sleeve, and mechanism intermediate said sleeve and the pinion by which the latter is moved into operative position at each alternate actuation of the sleeve.

44. The combination with wire feeding mechanism, the carriage having a rack 183 and jaws which grip the wire so that the carriage will be moved forward thereby, of sleeve 54 carrying a cam 60, mechanism for imparting intermittent half rotations to said sleeve, connected slides 187 and 206 which are adapted to be actuated by said cam, pinion 184 carried by slide 187 and adapted to engage the rack, and suitable mechanism for rotating the pinion.

45. The combination with wire feeding mechanism, the carriage having a rack 183 and jaws which grip the wire so that the carriage will be moved forward thereby, of sleeve 54 carrying a cam 60, mechanism for imparting intermittent half rotations to said sleeve, slide 206 above the bed, slide 187 on the under side of the bed, a yielding connection between said slides for the purpose set forth, pinion 184 carried by slide 187 and adapted to engage the rack, and suitable mechanism for rotating the pinion.

46. The combination with wire feeding mechanism, the carriage having a rack 183 and jaws which grip the wire so that the carriage will be carried forward thereby, of the main shaft, shaft 201 which receives motion therefrom, sleeve 54 journaled on the main shaft and carrying a cam 60, mechanism for imparting intermittent half rotations to said sleeve, connected slides 187 and 206 which are adapted to be actuated by said cam, shaft 185 journaled in slide 187 and carrying a pinion 184 adapted to engage the rack and a bevel pinion 191, and suitable gearing intermediate shafts 185 and 201.

47. The combination with wire feeding mechanism, the carriage and jaws thereon which grip the wire so that the carriage is moved forward thereby, of sleeve 54, mechanism for imparting intermittent half rotations to said sleeve, and suitable mechanisms actuated by said sleeve by which the jaws are operated to release the wire, and the carriage is returned to its normal position at each alternate actuation of said sleeve.

48. The combination with wire feeding mechanism, the carriage and jaws thereon through which the wire passes, of sleeve 54, mechanism for imparting intermittent half rotations to said sleeve, mechanism intermediate said sleeve and said jaws whereby the jaws are caused to grip the wire at one actuation of the machine, so that the carriage will be moved forward by the wire, and for releasing said jaws at the next actuation of the machine, and suitable mechansm intermediate said sleeve and carriage whereby the latter is returned to its normal position the instant the jaws release the wire.

49. The combination with wire feeding mechanism, the carriage, jaws mounted thereon through which the wire passes, and a slide carrying a saw adapted to move transversely to the carriage, of sleeve 54, mechanism for imparting intermittent half rotations to said sleeve, mechanism intermediate said sleeve and said jaws whereby the jaws are caused to grip the wire at one actuation of the machine, so that the carriage will be moved forward by the wire and for releasing said jaws at the next actuation of the machine, suitable mechanism intermediate said sleeve and the slide so that the slide and saw are moved inward transversely to the carriage as the latter moves forward, whereby a blank is severed, and suitable mechanism intermediate said sleeve and the carriage whereby the latter is returned to its normal position the instant the jaws release the wire.

50. The combination with wire feeding mechanism, the carriage carrying jaws adapted to grip and release the wire, and a slide having a saw mounted thereon and adapted to move transversely to the carriage, of guides consisting of fixed and movable jaws through which the wire passes, and suitable mechanism for actuating the movable jaws to release the blank after it has been severed.

51. The combination with wire feeding mechanism, the carriage carrying jaws adapted to grip and release the wire, and a slide having a saw mounted thereon and adapted to move transversely to the carriage, of guides consisting of fixed and movable jaws, an adjustable gage against which the end of the wire strikes and which determines the length of the blanks, and mechanism for throwing the gage out of operative position and for actuating the movable jaws to release the severed blanks.

In testimony whereof I affix my signature in presence of two witnesses.

ABEL KENWORTHY.

Witnesses:
   FLOYD S. LEWIS,
   ERNEST A. LEWIS.